US012591095B2

(12) United States Patent
Lu et al.

(10) Patent No.: US 12,591,095 B2
(45) Date of Patent: Mar. 31, 2026

(54) TECHNIQUES FOR GRATING COUPLER AND EDGE COUPLER INTEGRATION

(71) Applicant: Taiwan Semiconductor Manufacturing Company, Ltd., Hsinchu (TW)

(72) Inventors: Hau-Yan Lu, Hsinchu (TW); Wei-Kang Liu, Taichung (TW); Yingkit Felix Tsui, Cupertino, CA (US)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 269 days.

(21) Appl. No.: 18/302,224

(22) Filed: Apr. 18, 2023

(65) Prior Publication Data

US 2024/0353625 A1 Oct. 24, 2024

(51) Int. Cl.
*G02B 6/30* (2006.01)
*G02B 6/124* (2006.01)
*G02B 6/136* (2006.01)
*G02B 6/34* (2006.01)

(52) U.S. Cl.
CPC ............. *G02B 6/305* (2013.01); *G02B 6/124* (2013.01); *G02B 6/136* (2013.01); *G02B 6/34* (2013.01)

(58) Field of Classification Search
CPC ........ G02B 6/124; G02B 6/136; G02B 6/305; G02B 6/34
See application file for complete search history.

(56) References Cited

U.S. PATENT DOCUMENTS 9,435,961 B2 9/2016 Jiang
2012/0250007 A1* 10/2012 Na .......................... G01M 11/00
356/73.1
2023/0064550 A1 3/2023 Hsu et al.

FOREIGN PATENT DOCUMENTS

CN 108132499 A 6/2018

OTHER PUBLICATIONS

Mu et al. "Edge Couplers in Silicon Photonic Integrated Circuits: A Review" Appl. Sci. 2020, 10, 1538; doi:10.3390/app10041538, published on Feb. 24, 2020.

* cited by examiner

*Primary Examiner* — Michael P Mooney
(74) *Attorney, Agent, or Firm* — Eschweiler & Potashnik, LLC

(57) ABSTRACT

Some embodiments relate to an integrated chip (IC) including a handle substrate; a semiconductor layer comprising a grating coupler region and an edge coupler region; an insulative layer between the handle substrate and the semiconductor layer; a grating coupler in the grating coupler region comprising a plurality of trenches arranged in the semiconductor layer; and an edge coupler in the edge coupler region of the semiconductor layer including: a base structure having an end proximate to an edge of the insulative layer, and tapered sidewalls extending laterally from the end; and an upper structure extending over the base structure, the upper structure having an end proximate to the edge of the insulative layer, and tapered sidewalls extending laterally from the end between the tapered sidewalls of the base structure; where the handle substrate continuously extends from directly beneath the plurality of trenches to directly beneath the upper structure.

20 Claims, 29 Drawing Sheets

200c

200d

300c

1500c

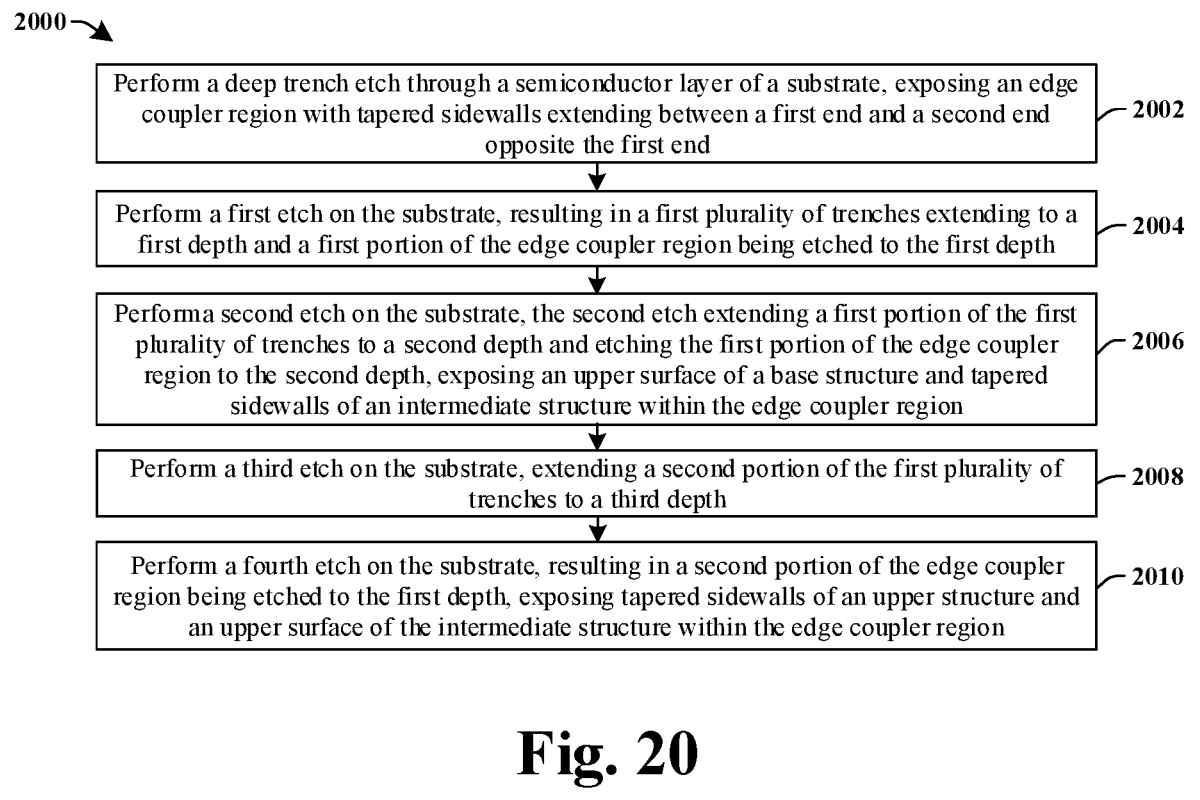

2000 ⟍

| Perform a deep trench etch through a semiconductor layer of a substrate, exposing an edge coupler region with tapered sidewalls extending between a first end and a second end opposite the first end | ⌐ 2002 |

↓

| Perform a first etch on the substrate, resulting in a first plurality of trenches extending to a first depth and a first portion of the edge coupler region being etched to the first depth | ⌐ 2004 |

↓

| Perform a second etch on the substrate, the second etch extending a first portion of the first plurality of trenches to a second depth and etching the first portion of the edge coupler region to the second depth, exposing an upper surface of a base structure and tapered sidewalls of an intermediate structure within the edge coupler region | ⌐ 2006 |

↓

| Perform a third etch on the substrate, extending a second portion of the first plurality of trenches to a third depth | ⌐ 2008 |

↓

| Perform a fourth etch on the substrate, resulting in a second portion of the edge coupler region being etched to the first depth, exposing tapered sidewalls of an upper structure and an upper surface of the intermediate structure within the edge coupler region | ⌐ 2010 |

Fig. 20

TECHNIQUES FOR GRATING COUPLER AND EDGE COUPLER INTEGRATION

BACKGROUND

Optical couplers (such as grating couplers and edge couplers) are often used as components in photonic integrated circuits (PICs), which integrate multiple photonic functions. Optical couplers are used to confine and guide light from an optical fiber to an integrated chip with minimal attenuation. Grating couplers are more compact than edge couplers, and allow for a greater variation in coupling position. Edge couplers feature a higher coupling efficiency and broader bandwidth than grating couplers.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 20 illustrates a flow diagram of some embodiments of a method for forming a PIC including a grating coupler and an edge coupler.

DETAILED DESCRIPTION

Figure 1A:
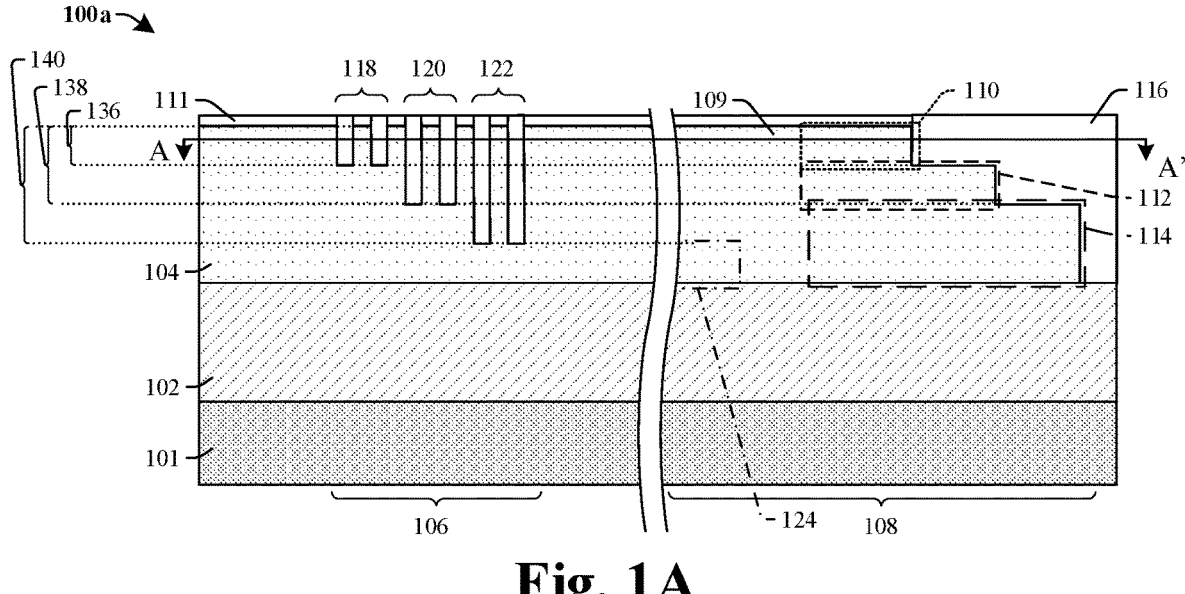
FIGS. 1A, 1B, and 1C illustrate a cross-sectional view, top view, and perspective view of some embodiments of a PIC including a grating coupler and an edge coupler, according to the present disclosure.

The present disclosure provides many different embodiments, or examples, for implementing different features of this disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Photonic integrated circuits (PICs) utilize electromagnetic waves to provide high speed signal communication. The use of electromagnetic waves provides lower power consumption and generates less heat than conventional electrical signals. PICs receive the electromagnetic waves through optical couplers. Grating couplers and edge couplers are examples of optical couplers. Edge couplers have a higher coupling efficiency and broader bandwidth than grating couplers, though they are most effective when placed at the edge of a chip and take up a larger amount of space than grating couplers. Grating couplers have a more compact design and may potentially be placed in more spaces on the chip, but they typically have a lower coupling efficiency and lower bandwidth than edge couplers. As there are tradeoffs in choosing one type of optical coupler over the other, edge couplers and grating couplers have different tasks and functions in a PIC at which they are more effective. In many cases, a combination of grating couplers and edge couplers is desired to be able to integrate the different functions on the same chip. However, forming grating couplers and edge couplers separately is both time consuming and costly, making a PIC utilizing both edge couplers and grating couplers on the same chip impractical.

The present disclosure provides for techniques to integrate the fabrication of a grating coupler with the fabrication of an edge coupler on the same substrate. First, a deep trench etch is performed on a substrate including a semiconductor layer, separating a grating coupler region from an edge coupler region. A first etch is then performed according to a first mask, which results in a plurality of trenches being formed in the grating coupler region and a first portion in the edge coupler region being etched back to a first depth. A second etch is then performed according to a second mask, extending a first portion of the plurality of trenches to a second depth while also etching back the first portion in the edge coupler region to the second depth. The first etch and the second etch being performed on both the grating coupler region and the edge coupler region lowers the cost of production for a PIC utilizing both a grating coupler and an edge coupler on the same substrate, as the number of photolithography, patterning, deposition, and etching steps used in the method are reduced.

Figure 1B:
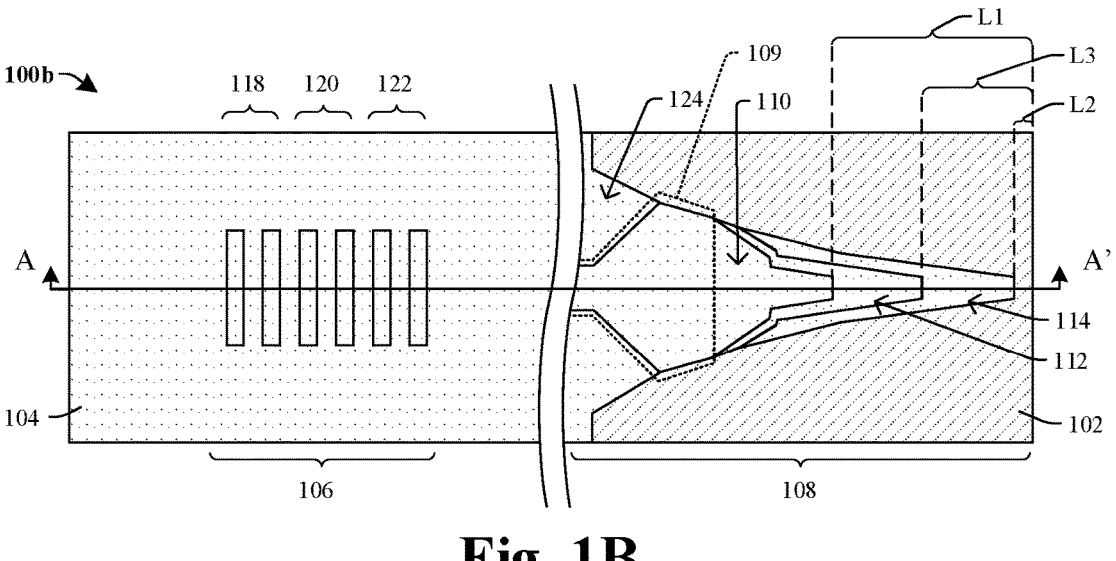
Figure 1C:
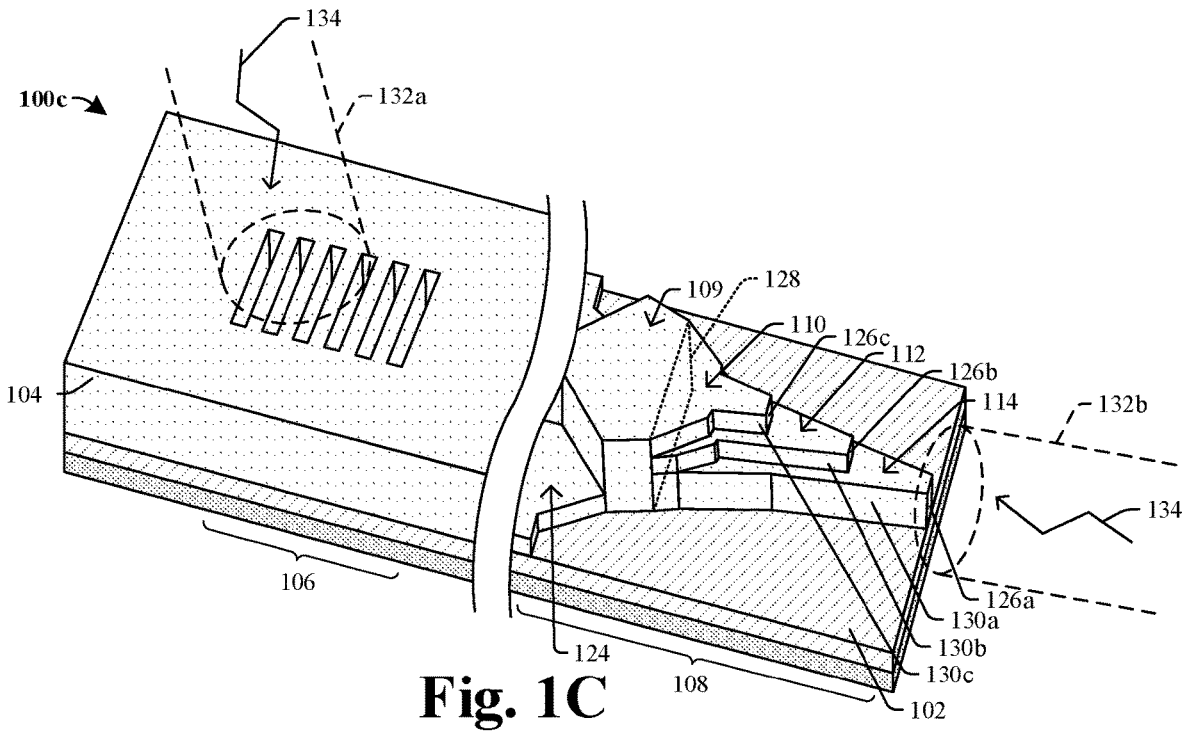
Figure 2A:
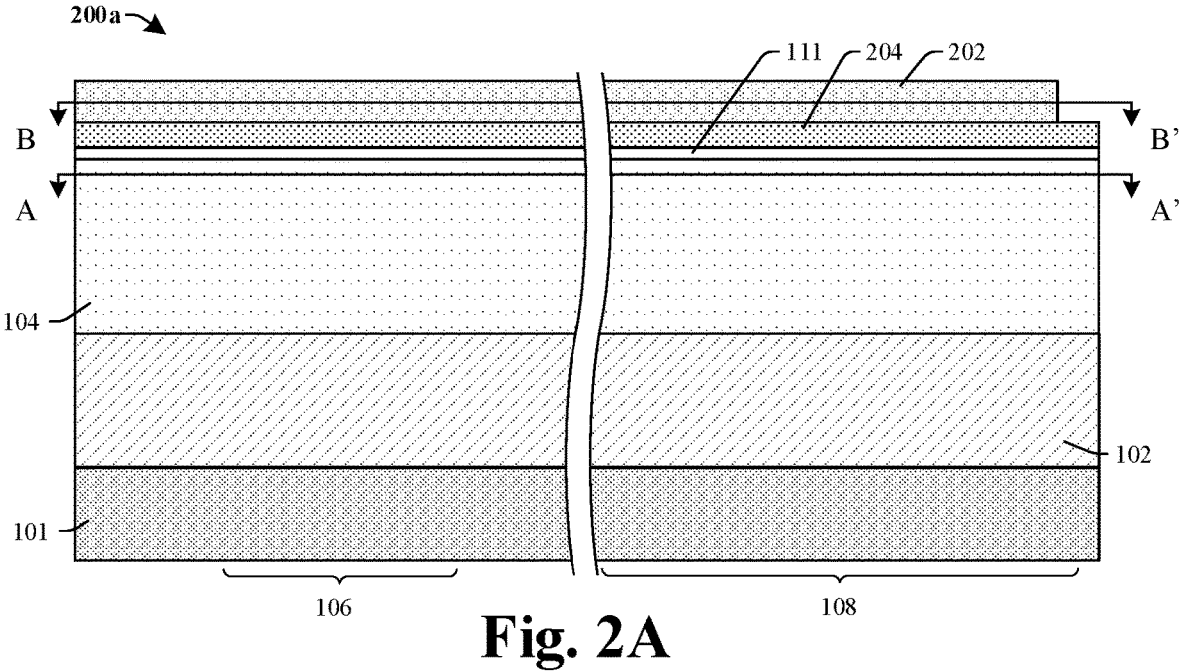
FIGS. 2A-2D, 3A-3C, 4A, 4B, 5A-5C, 6A-6C, 7A-7C, 8A-8C, 9A-9C, 10A, 10B, 11A, 11B, 12A, 12B, 13A, 13B, 14A-14C, and 15A-15C illustrate a series of incremental manufacturing steps as a series of top, cross-sectional, and perspective views.
Figure 2B:
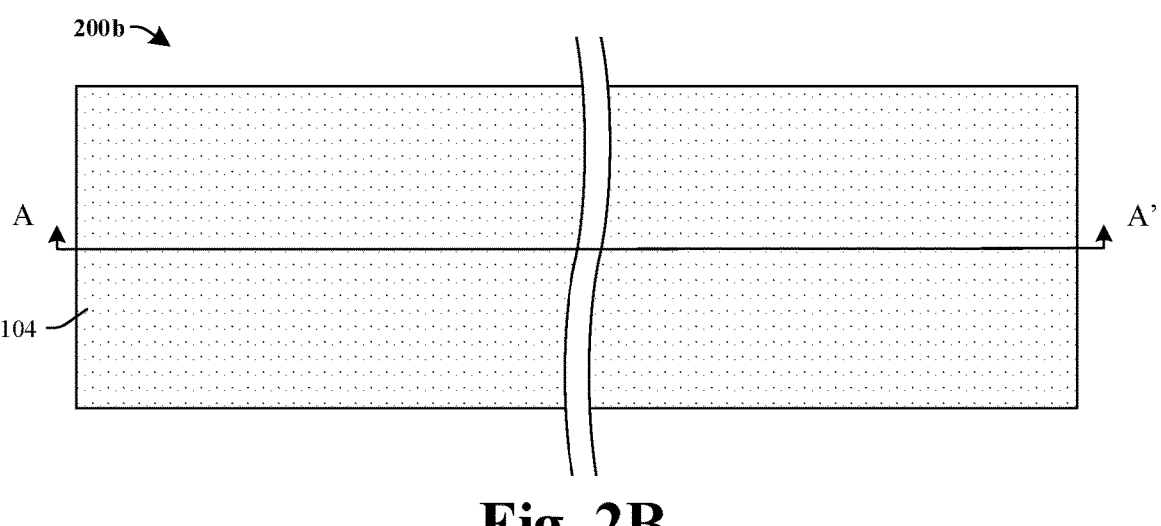
Figure 2C:
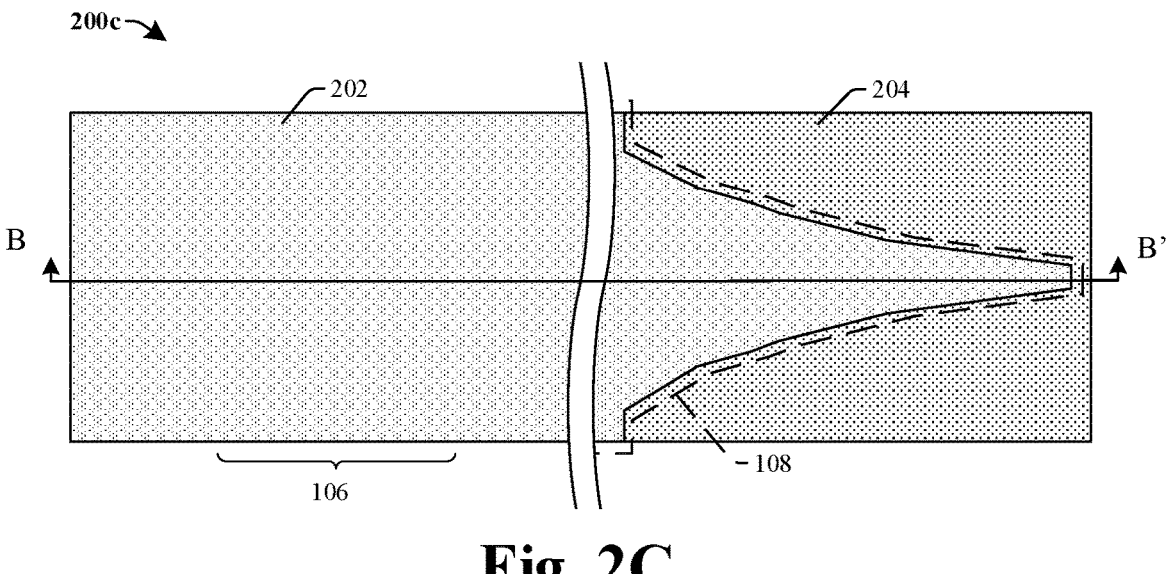
Figure 2D:
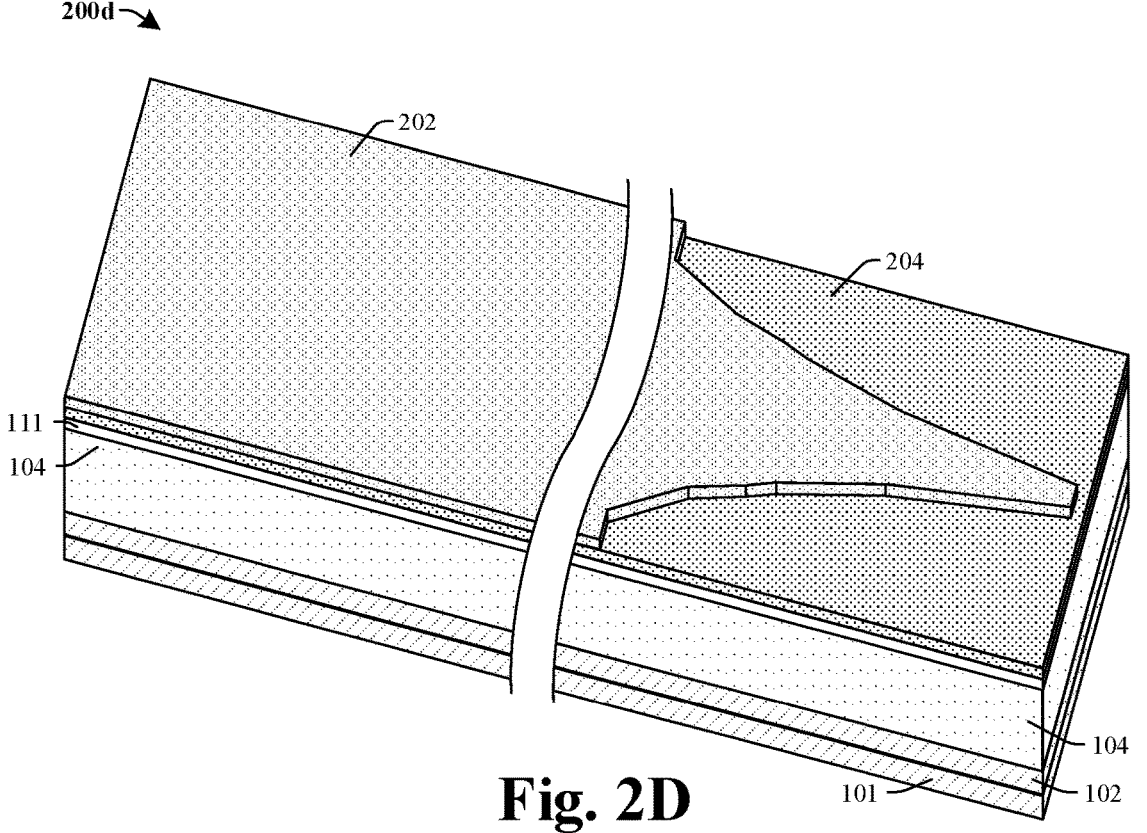

FIGS. 1A, 1B, and 1C illustrate a top view 100a, cross-sectional view 100b, and perspective view 100c of some embodiments of a PIC including a grating coupler and an edge coupler, according to the present disclosure. FIGS. 1A, 1B, and 1C are now described concurrently.

The PIC includes a semiconductor layer 104 over an insulative layer 102. A handle substrate 101 underlies the insulative layer 102. A grating coupler region 106 is within the semiconductor layer 104 on one part of the PIC, and an edge coupler region 108 is within the semiconductor layer 104 on another part of the PIC proximate to the edge of the insulative layer 102. The insulative layer 102 extends continuously between the grating coupler region 106 and the edge coupler region 108. An insulative pad 111 is directly above upper surfaces of the semiconductor layer 104, and an insulator 116 surrounds sidewalls of the semiconductor layer 104. The insulator 116 (see FIG. 1A) is not shown in FIGS. 1B and 1C to better show the structure in the edge coupler region 108. In some embodiments, the semiconductor layer 104, the insulative layer 102, and the handle substrate 101 are part of a silicon-on-insulator (SOI) substrate. Optical fibers or other optical structures 132a, 132b (shown in phantom in FIG. 1C) are coupled to the grating coupler region 106 and the edge coupler region 108. The optical fibers or other optical structures 132a, 132b transfer electromagnetic waves 134 into the optical couplers in the grating coupler region 106 and the edge coupler region 108. The optical couplers then pass the electromagnetic waves 134 further into the PIC (see FIG. 19A).

A base structure 114, an intermediate structure 112, and an upper structure 110 are stacked in the edge coupler region 108, forming an edge coupler. The base structure 114 extends to the insulative layer 102, and the upper structure 110 extends to an uppermost surface of the semiconductor layer 104. The base structure 114, the intermediate structure 112, and the upper structure 110 respectively have a first end 126a, 126b, 126c facing a same direction and a second end 128 (shown in phantom) opposite the first ends 126a, 126b, 126c. In some embodiments, the base structure 114, the intermediate structure 112, and the upper structure 110 have a coterminous second end 128. Tapered sidewalls 130a, 130b, 130c extend between the first end 126a, 126b, 126c and the coterminous second end 128 of the base structure 114, the intermediate structure 112, and the upper structure 110. In some embodiments, the coterminous second end 128 is within the semiconductor layer 104. In other embodiments, the coterminous second end 128 is at a sidewall of the semiconductor layer 104. In some embodiments, the first end 126c of the upper structure 110 is a first distance L1 from the edge of the insulative layer 102, and the first end 126a of the base structure 114 is a second distance L2 from the edge of the insulative layer 102. In further embodiments, the second distance L2 is less than the first distance L1. In other embodiments, the second distance L2 is greater than the first distance L1. In some embodiments, the first end 126b of the intermediate structure 112 is a third distance L3 from the edge of the insulative layer 102, and the third distance L3 is between the first distance L1 and the second distance L2.

An edge coupler with multiple tapered structures such as the base structure 114, the intermediate structure 112, and the upper structure 110 may reduce the coupling loss, while increasing the bandwidth and alignment tolerance of the edge coupler when compared to edge couplers defined by a single tapered structure. The addition of multiple tapered structures to an edge coupler also adds greater complexity to the method of fabrication, including added cost and time used to form the tapered structures. In some embodiments, a back structure 124 is also in the edge coupler region 108, and is separated from the base structure 114 by an extended structure 109 of the semiconductor layer 104.

A plurality of trenches of various depths are arranged in the grating coupler region 106. A first set of trenches 118 are arranged to one side of the grating coupler region, a second set of trenches 120 are arranged proximate to the first set of trenches 118, and a third set of trenches 122 are arranged proximate to the second set of trenches 120 opposite the first set of trenches 118. In some embodiments, there are one or more additional sets of trenches. In other embodiments, the third set of trenches is omitted leaving the first and second sets of trenches 118, 120. In some embodiments, the plurality of trenches has a quantity approximately between 10 and 30 trenches, approximately between 6 and 20 trenches, approximately between 15 and 40 trenches, or within another suitable range. In some embodiments, the plurality of trenches are divided equally between the sets of trenches.

The plurality of trenches in the grating coupler region 106 extend to a plurality of depths 136, 138, 140 (see FIG. 1A). In some embodiments, the depths of the trenches increase from one side of the grating coupler region 106 to the other. That is, the first set of trenches 118 may have a first depth 136, and the second set of trenches 120 may have a second depth 138 greater than the first depth 136, and the third set of trenches 122 may have a third depth 140 greater than the second depth 138. This change in depth of the trenches reduces the coupling loss between the optical fiber or other optical structures 132a transferring the electromagnetic waves 134 and the photonic circuit by guiding the electromagnetic waves 134 through the grating coupler in one direction. The multiple depths of the trenches also increase the complexity of the method used to form the grating coupler, adding one or more additional patterning and etching steps to the process. In some embodiments, the first set of trenches 118 of the plurality of trenches extend from an upper surface of the upper structure 110 to a bottom surface level with an upper surface of the intermediate structure 112. That is, the upper surface of the intermediate structure 112 is at the first depth 136 from the upper surface of the upper structure 110.

Both the grating coupler and the edge coupler benefit from designs that use more complex methods to fabricate, and the steps added due to this complexity increase the cost in time and resources incurred when the grating coupler and the edge coupler are formed separately. The integrated process flow described herein describes a method of forming a grating coupler with multiple trench depths and an edge coupler with multiple tapered structures using the same photolithography and etching steps in their fabrication, leading to a reduction in cost and time spent in forming the optical couplers in the complex forms previously described.

With reference to FIGS. 2A-2D, 3A-3C, 4A, 4B, 5A-5C, 6A-6C, 7A-7C, 8A-8C, 9A-9C, 10A, 10B, 11A, 11B, 12A, 12B, 13A, 13B, 14A-14C, and 15A-15C, cross-sectional views of some embodiments of a PIC having both an edge coupler and a grating coupler at various stages of manufacture are provided. Although FIGS. 2A-2D, 3A-3C, 4A, 4B, 5A-5C, 6A-6C, 7A-7C, 8A-8C, 9A-9C, 10A, 10B, 11A, 11B, 12A, 12B, 13A, 13B, 14A-14C, and 15A-15C are described as a series of acts, it will be appreciated that these acts are not limiting in that the order of the acts can be altered in other embodiments, and the methods disclosed are also applicable to other structures. In other embodiments, some acts that are illustrated and/or described may be omitted in whole or in part.

As illustrated in the cross-sectional view 200a, top views 200b, 200c, and perspective view 200d of FIGS. 2A, 2B, 2C, and 2D, a substrate including a handle substrate 101, an insulative layer 102, and the semiconductor layer 104 is received, and a first mask 202 and etch stop layer 204 are formed over the semiconductor layer 104. The first mask 202 covers the grating coupler region 106 and the edge coupler region 108, leaving an area around the edge coupler region 108 exposed. The etch stop layer 204 is formed over the insulative pad 111 before the first mask 202 is formed. In some embodiments, the first mask 202 is or comprises photoresist or other suitable materials, and/or is formed by photolithography or some other suitable process. In some embodiments, the etch stop layer 204 comprises silicon nitride ($Si_3N_4$) or the like, and the insulative pad 111 comprises silicon dioxide ($SiO_2$) or the like. In some embodiments, the handle substrate 101 and semiconductor layer 104 each comprise monocrystalline silicon, germanium, or the like.

Figure 3A:
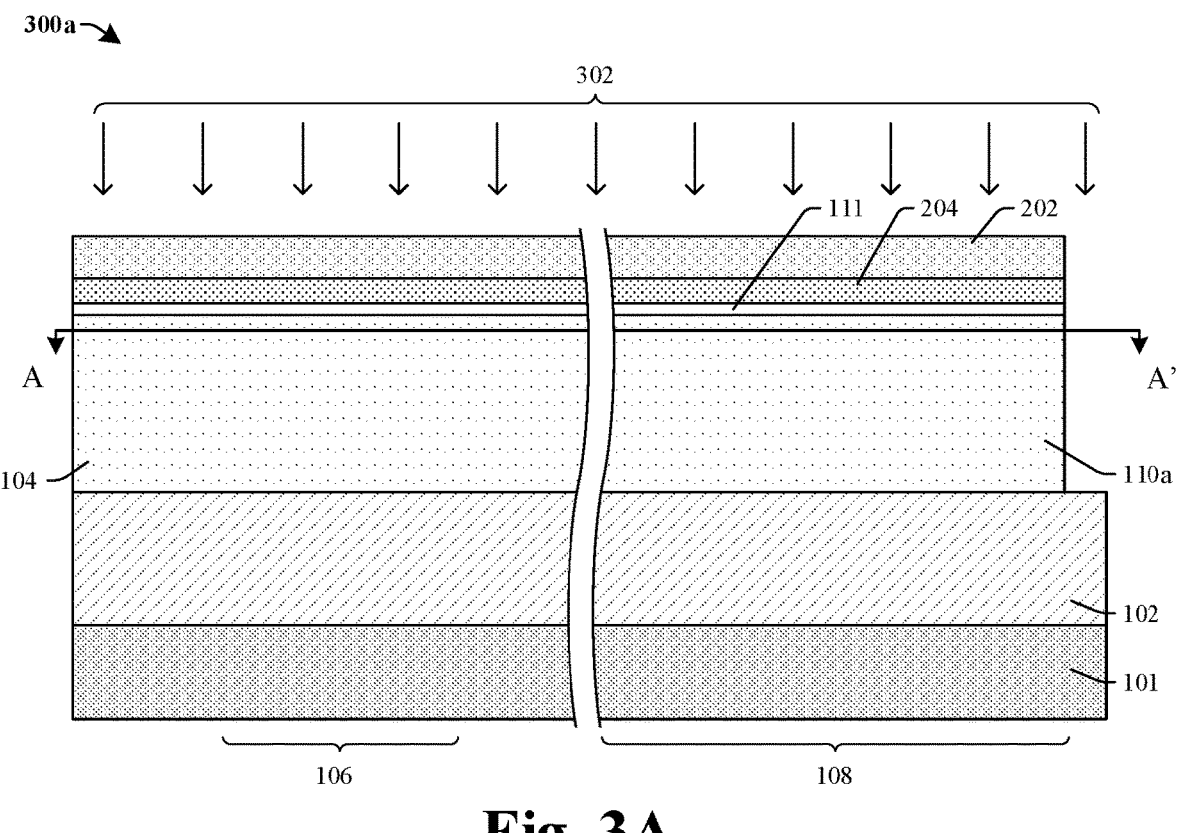
Figure 3B:
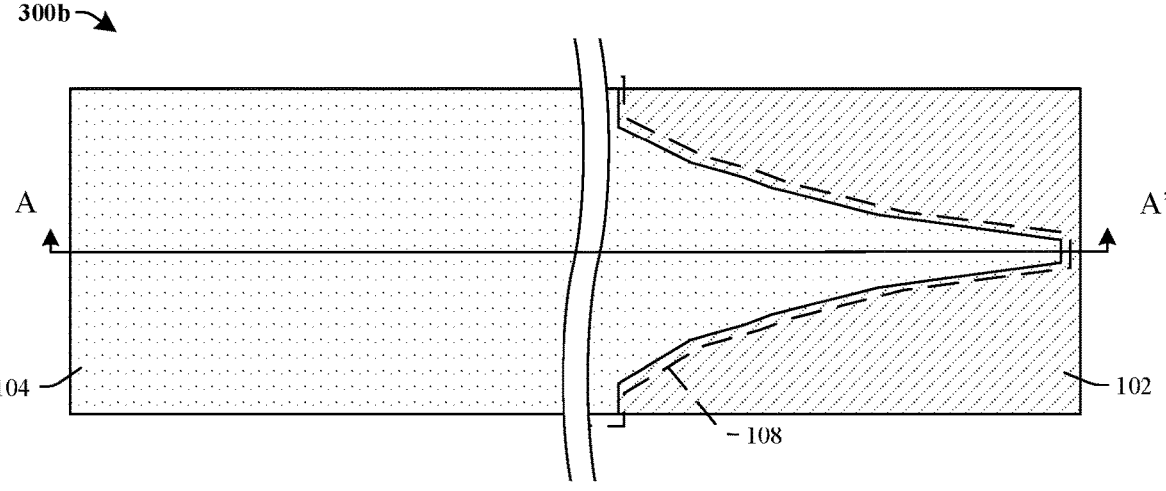
Figure 3C:
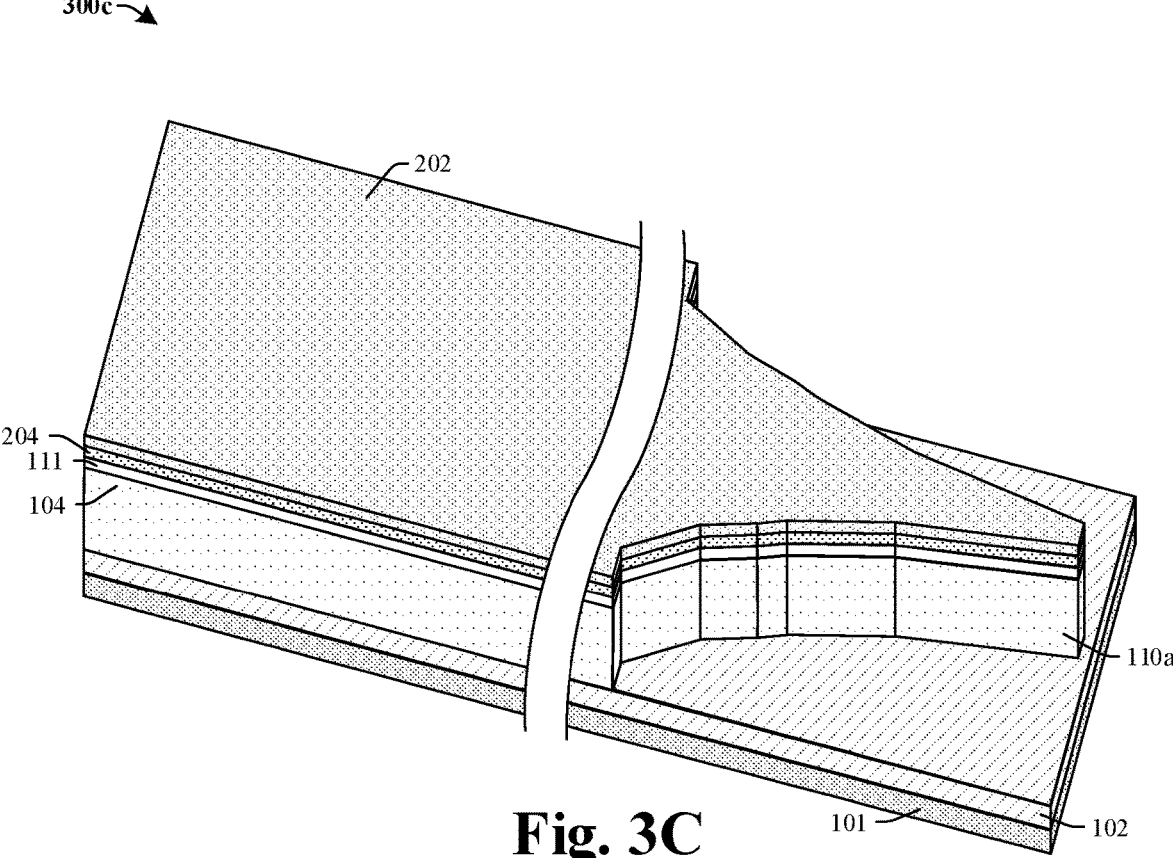

As illustrated in the cross-sectional view 300a, top view 300b, and perspective view 300c of FIGS. 3A, 3B, and 3C, a deep trench etch 302 is performed on the semiconductor layer 104 according to the first mask 202, removing portions of the semiconductor layer 104 outside the grating coupler region 106 and the edge coupler region 108. The deep trench etch 302 exposes the insulative layer 102 beneath the semiconductor layer 104, and completely isolates the grating coupler region 106 from the edge coupler region 108. In some embodiments, the deep trench etch 302 results in the semiconductor layer within the edge coupler region having tapered sidewalls. In some embodiments, the deep trench etch 302 may comprise a dry etch.

Figure 4A:
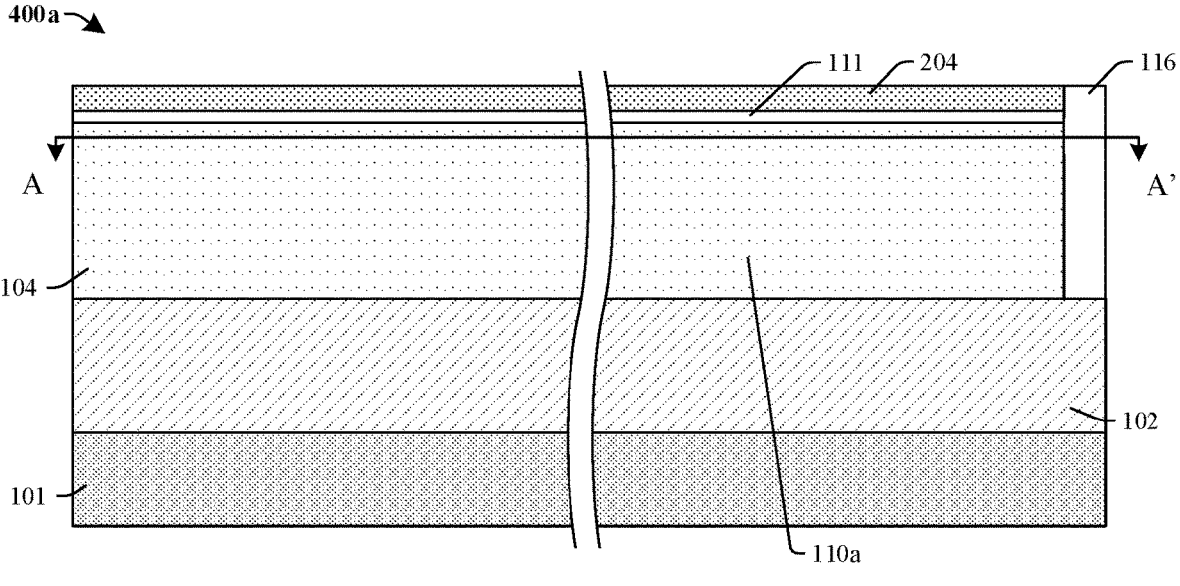
Figure 4B:
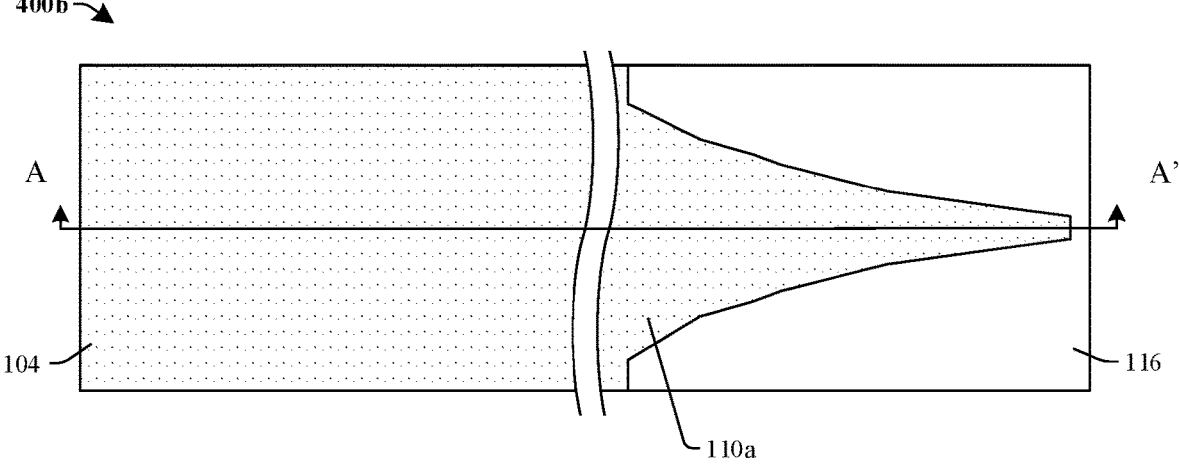
Figure 5A:
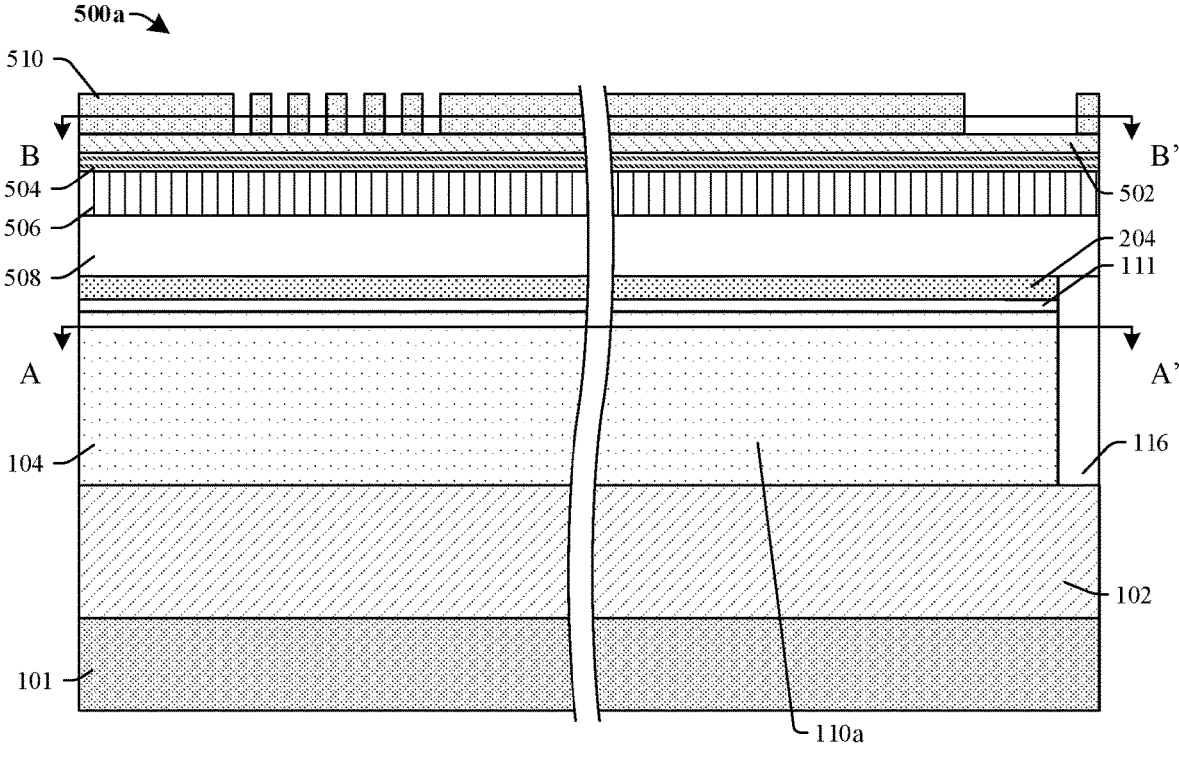
Figure 5B:
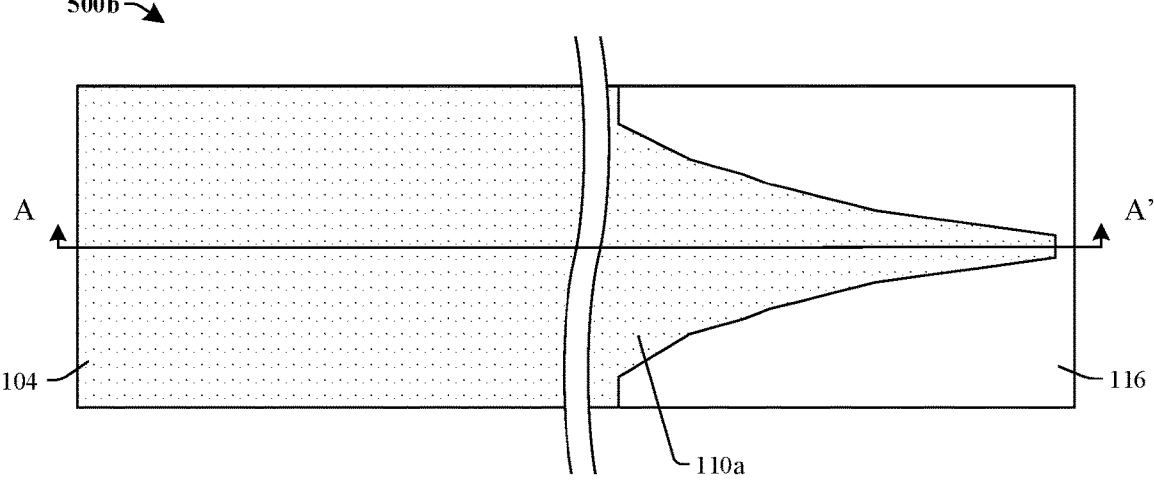
Figure 5C:
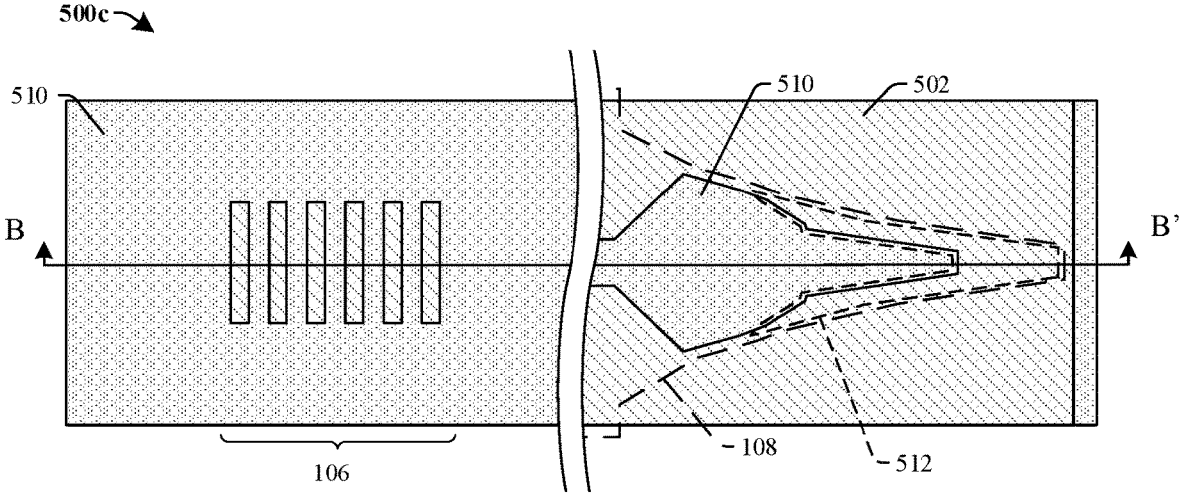

As illustrated in the cross-sectional view 400a and top view 400b of FIGS. 4A and 4B, the insulator 116 is formed in the openings formed by the deep trench etch 302 (see FIGS. 5A-5C). Further, the first mask 202 and portions of the insulator 116 above the etch stop layer 204 are removed. In some embodiments, the first mask 202 and the portions are removed using a planarization process (e.g., a chemical mechanical planarization (CMP) process. In some embodiments, the insulator 116 is formed by and/or using chemical vapor deposition (CVD), physical vapor deposition (PVD), atomic layer deposition (ALD), some other suitable deposition process(es), or any combination of the foregoing. In some embodiments, the insulator 116 comprises silicon dioxide ($SiO_2$) or the like.

As illustrated in the cross-sectional view 500a and top views 500b, 500c of FIGS. 5A, 5B, and 5C, a hard mask layer 508, an advanced patterning film (APF) layer 506, a silicon oxynitride layer 504, and a bottom-layer anti-reflective coating (BARC) layer 502 are formed over the etch stop layer 204. Further, a second mask 510 is formed and patterned over the BARC layer 502. The second mask 510 exposes a series of rectangles in the BARC layer 502 over the grating coupler region 106. The second mask 510 further overlies part of the edge coupler region 108, leaving the BARC layer 502 over a first portion 512 of the edge coupler region 108 exposed. The first portion 512 corresponds to where the upper surface of the base structure 114 (see FIG. 1A) will be formed. The BARC layer 502 outside of the edge coupler region 108 is also exposed. In some embodiments, the hard mask layer 508, the APF layer 506, a silicon oxynitride layer 504, and the BARC layer 502 are formed by and/or using chemical vapor deposition (CVD), physical vapor deposition (PVD), atomic layer deposition (ALD), some other suitable deposition process(es), or any combination of the foregoing. In some embodiments, the second mask 510 is formed by depositing a mask layer and patterning the mask layer into the second mask 510. The depositing may, for example, be performed using CVD, PVD, ALD, a spin on process, some other suitable deposition process(es), or any combination of the foregoing. The patterning may, for example, be performed by a photolithography/etching process or some other suitable patterning process. In some embodiments, the APF layer 506 comprises amorphous carbon or the like. In some embodiments, the hard mask layer 508 comprises tetraethoxysilane (TEOS) or the like.

Figure 6A:
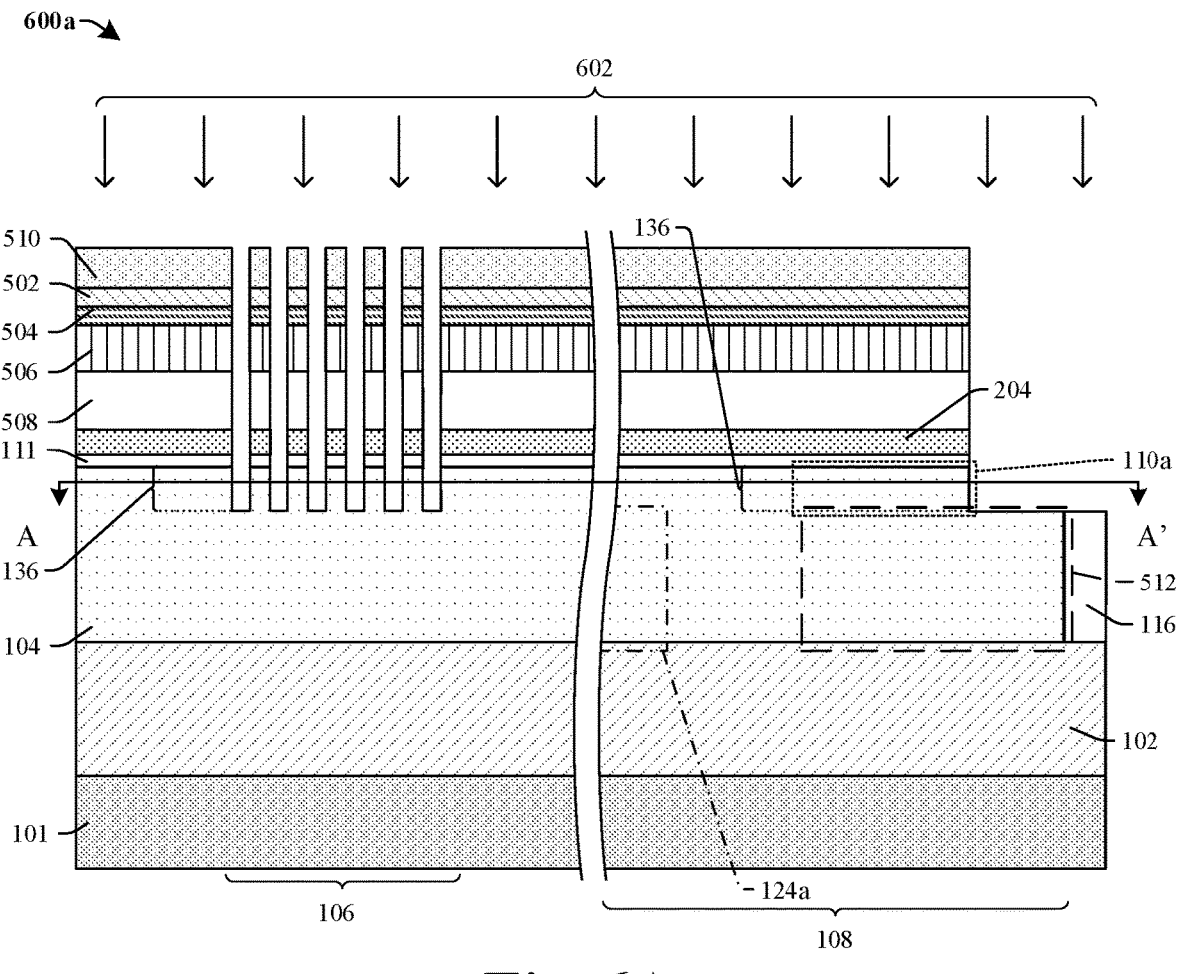
Figure 6B:
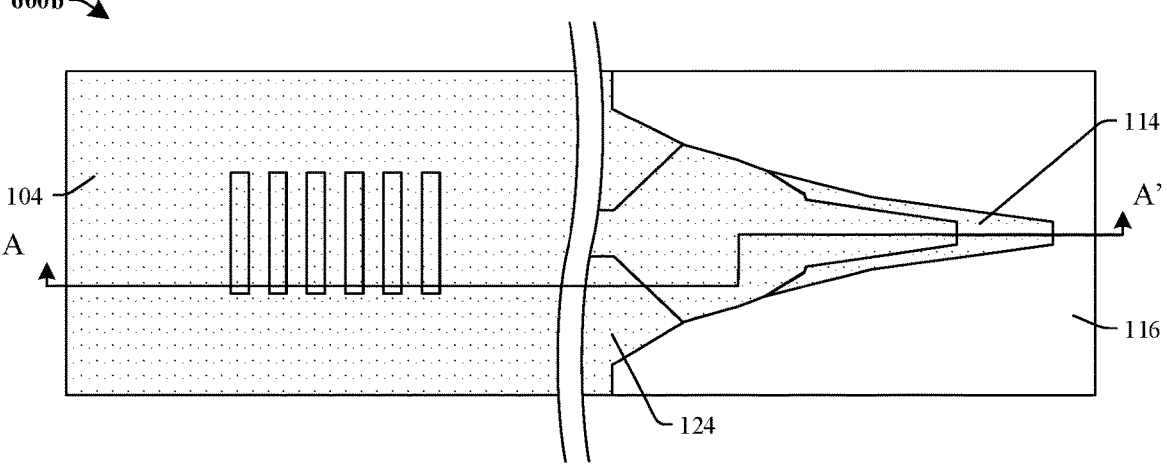
Figure 6C:
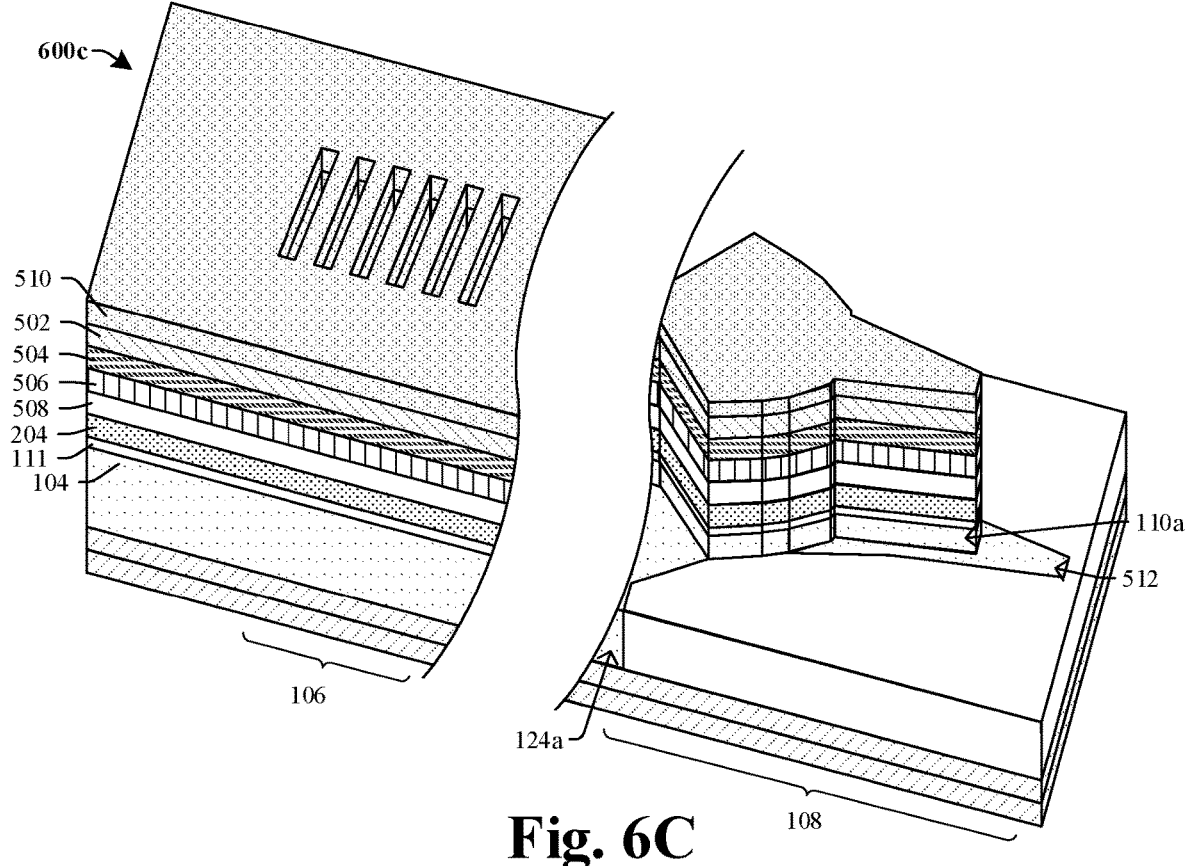

As illustrated in the cross-sectional view 600a, top view 600b, and perspective view 600c of FIGS. 6A, 6B, and 6C, a second etch 602 is performed, forming trenches in the grating coupler region 106 and etching the first portion 512 in the edge coupler region to a first depth 136. The second etch 602 exposes tapered sidewalls of an upper structure precursor 110a within the edge coupler region 108. In some embodiments, a portion of the insulator 116 is also etched. In some embodiments, a back portion 124a is also etched. In some embodiments, the second etch 602 is a dry etch. Combining the etching steps used in forming the trenches of the grating coupler and the tapered structures of the edge coupler results in a more cost effective fabrication of a PIC utilizing both the grating coupler and the edge coupler on the same chip. The reduction in cost increases the viability of a PIC with multiple types and variations of couplers on one chip, thereby allowing for a more flexible design of the final product.

Figure 7A:
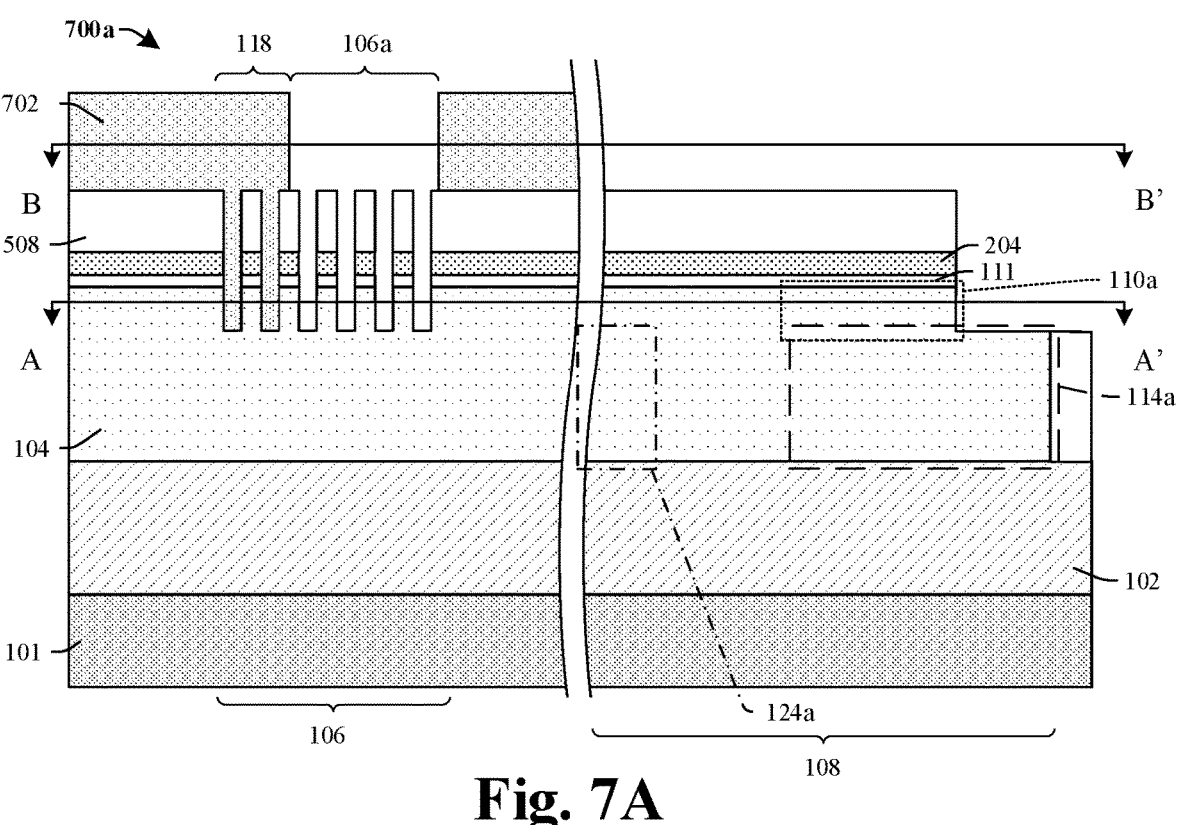
Figure 7B:
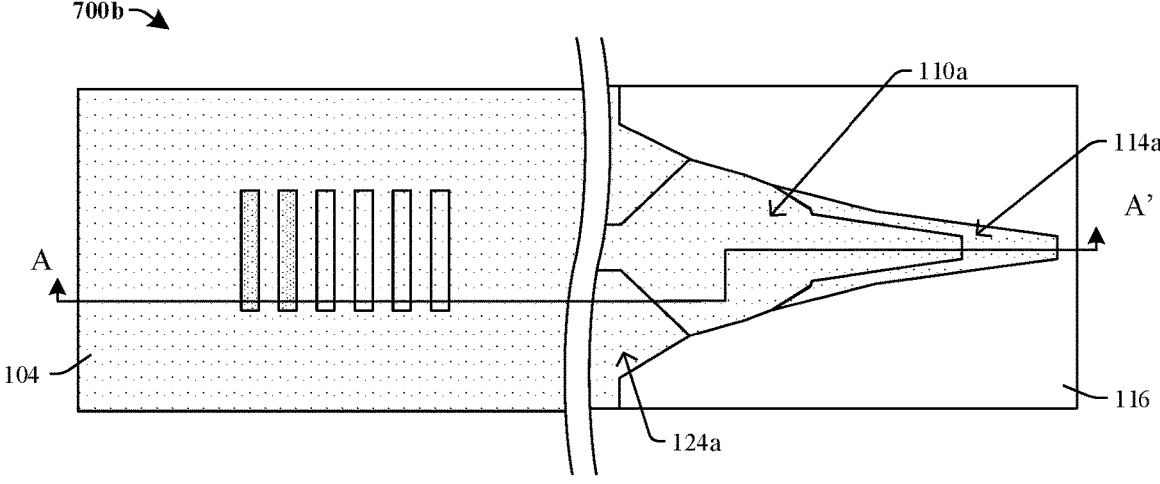
Figure 7C:
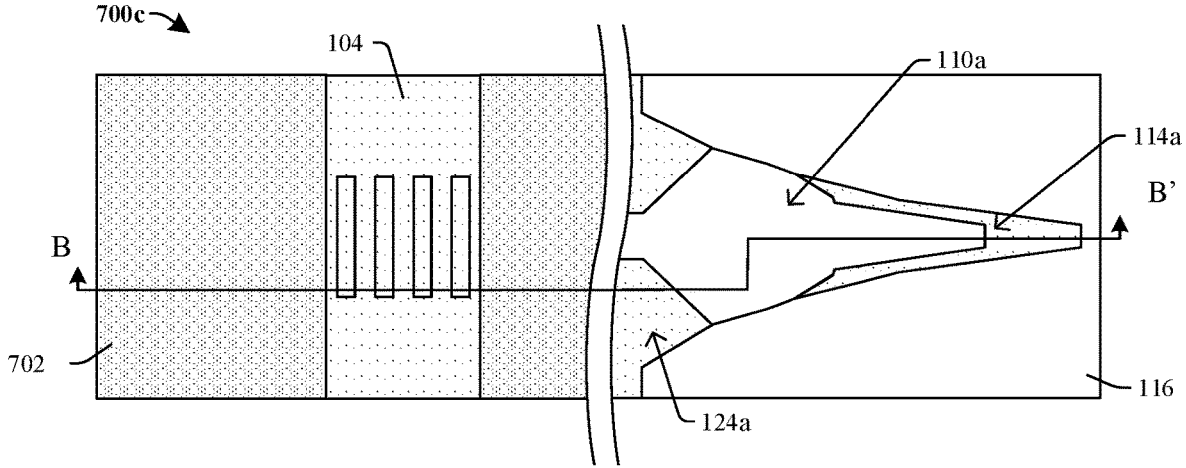

As illustrated in the cross-sectional view 700a and top views 700b, 700c of FIGS. 7A, 7B, and 7C, the APF layer 506 (see FIGS. 5A-5C), the silicon oxynitride layer 504, the BARC layer 502, and the second mask 510 are removed, and a third mask 702 is formed over the grating coupler region 106. The edge coupler region 108 is not covered by the third mask 702. As shown in FIG. 7A, the third mask 702 exposes a first portion 106a of the plurality of trenches in the grating coupler region 106 and covers a first set of trenches 118 of the plurality of trenches in the grating coupler region 106. In some embodiments, the APF layer 506, the silicon oxynitride layer 504, the BARC layer 502, and the second mask 510 are removed using a planarization process (e.g., a CMP process). In some embodiments, the third mask 702 is formed in a same way as the second mask 510.

Figures 8A, 8B:
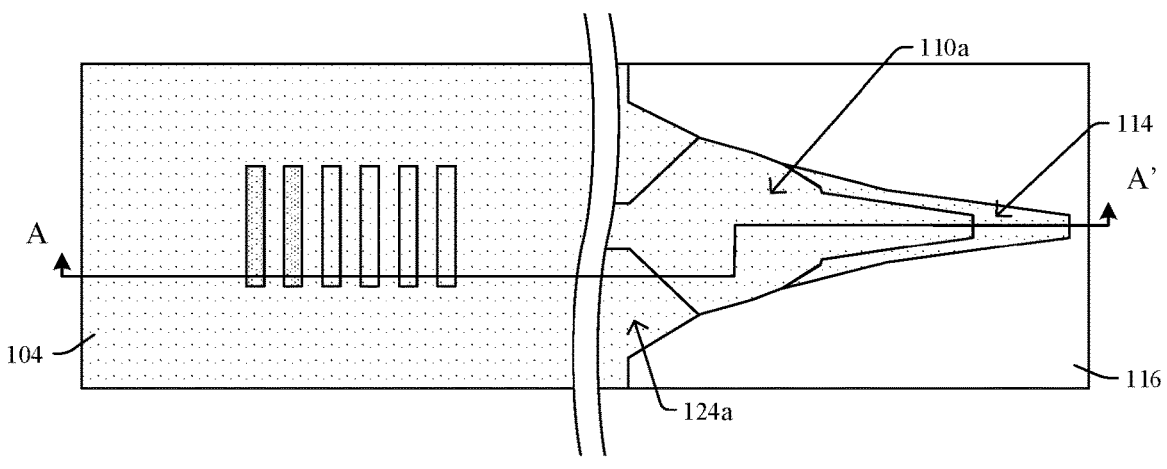
Figure 8C:
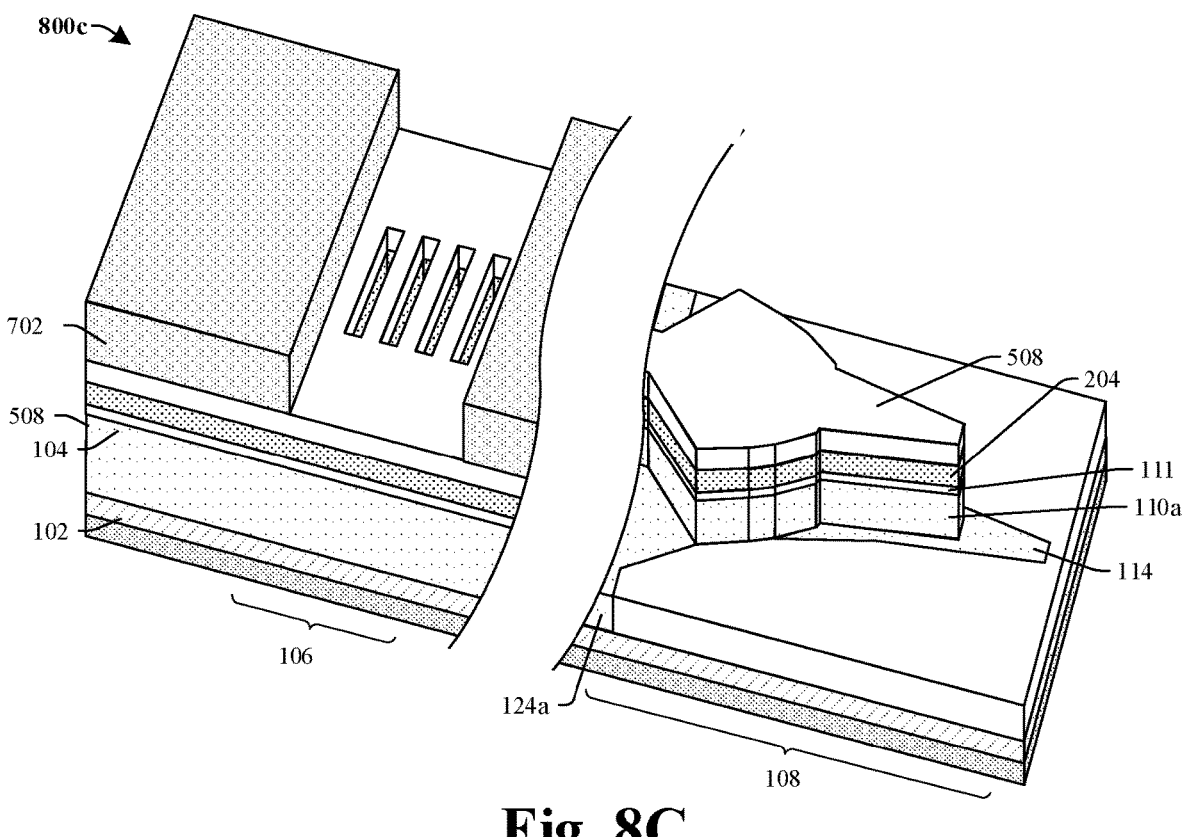

As illustrated in the cross-sectional view 800a, top view 800b, and perspective view 800c of FIGS. 8A, 8B, and 8C, a third etch 802 is performed according to the third mask 702, extending the first portion 106a of trenches in the grating coupler region 106 and further etching the first portion 512 in the edge coupler region to a second depth 312. The third etch 802 exposes an upper surface of the base structure 114. The third etch 802 further exposes tapered sidewalls of an upper structure precursor 110a within the edge coupler region 108. In some embodiments, a portion of the insulator 116 is also further etched. In some embodiments, a back portion 124a is also further etched. In some embodiments, the third etch 802 is a dry etch.

Figure 9A:
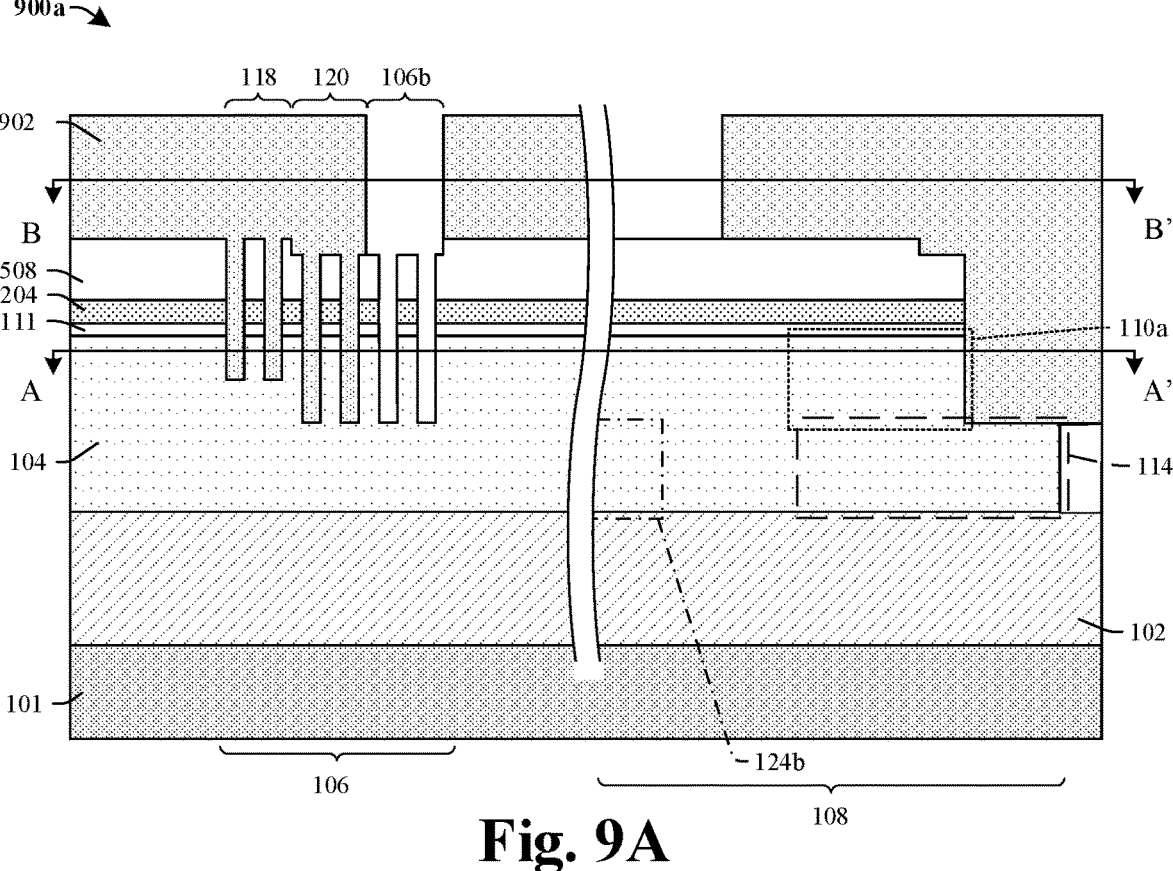
Figure 9B:
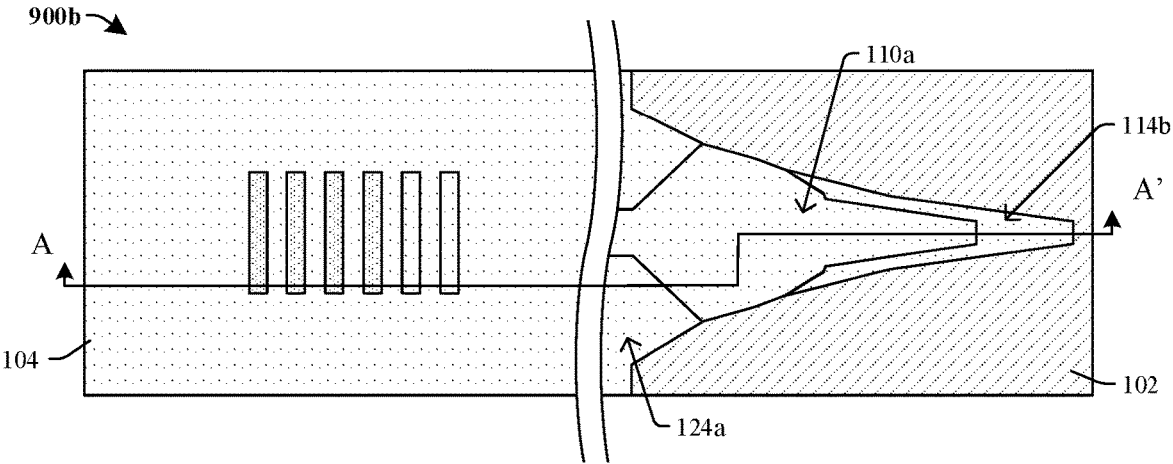
Figure 9C:
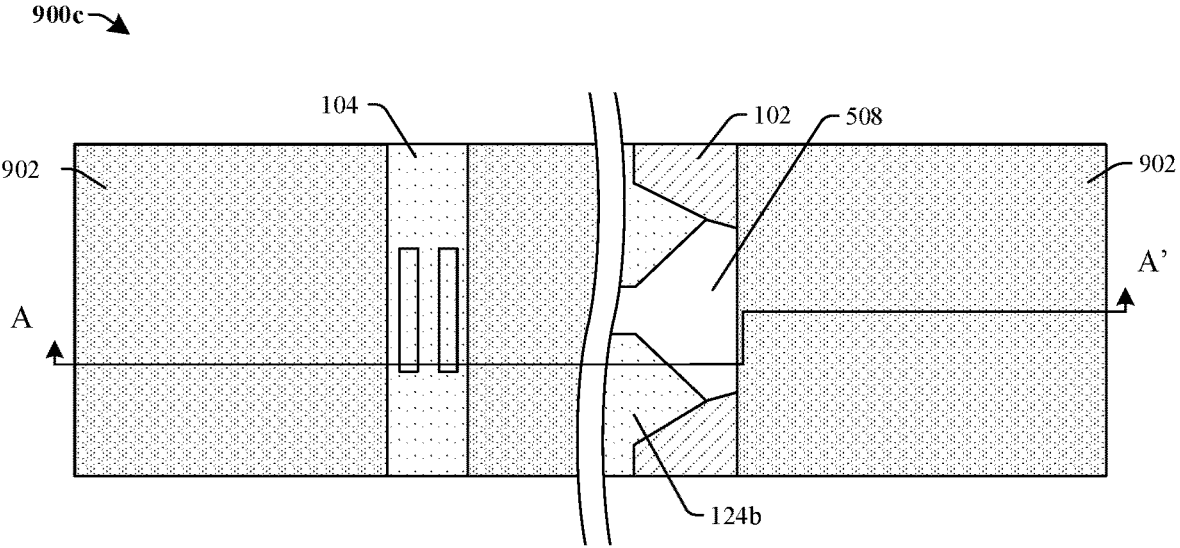
Figure 13A:
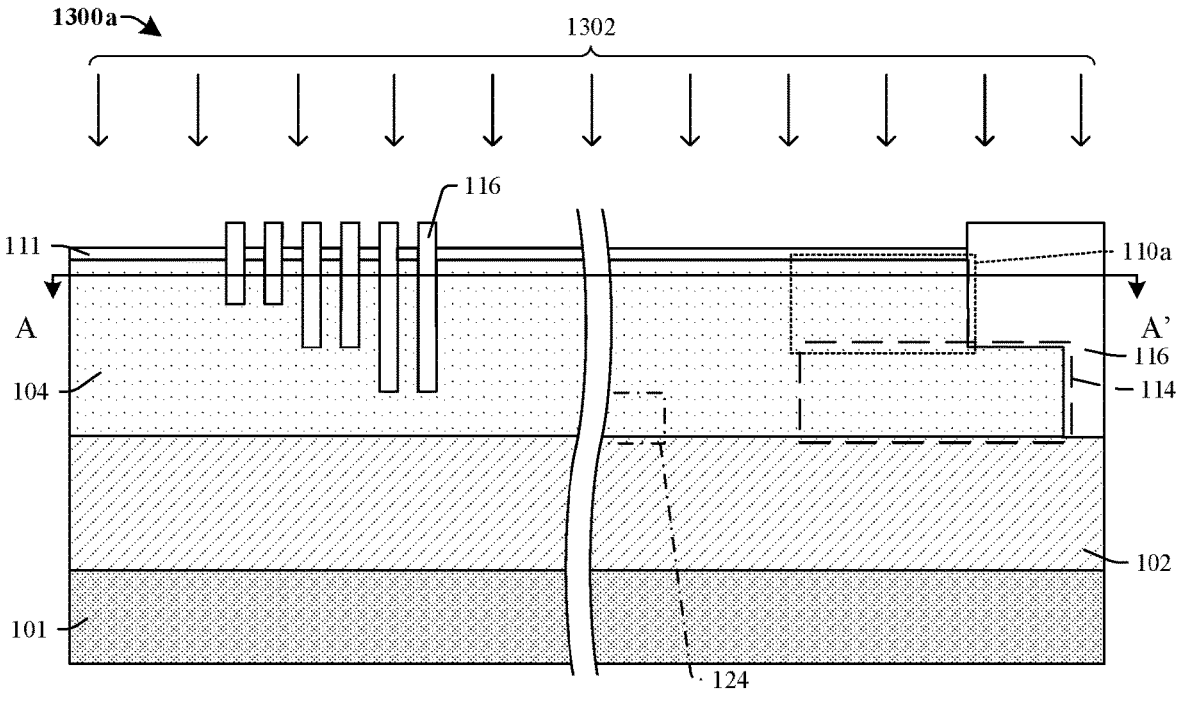

As illustrated in the cross-sectional view 900a and top views 900b, 900c of FIGS. 9A, 9B, and 9C, the third mask 702 is removed and a fourth mask 902 is formed over the grating coupler region 106 and the edge coupler region 108. As shown in FIG. 13A, the fourth mask 902 exposes a second portion 106b of the plurality of trenches in the grating coupler region 106 and covers a first and second set of trenches 118, 120 of the plurality of trenches in the grating coupler region 106. In some embodiments, the third mask 702 is removed using one or more stripping processes. In some embodiments, the fourth mask 902 is formed in a same way as the second mask 510.

Figure 10A:
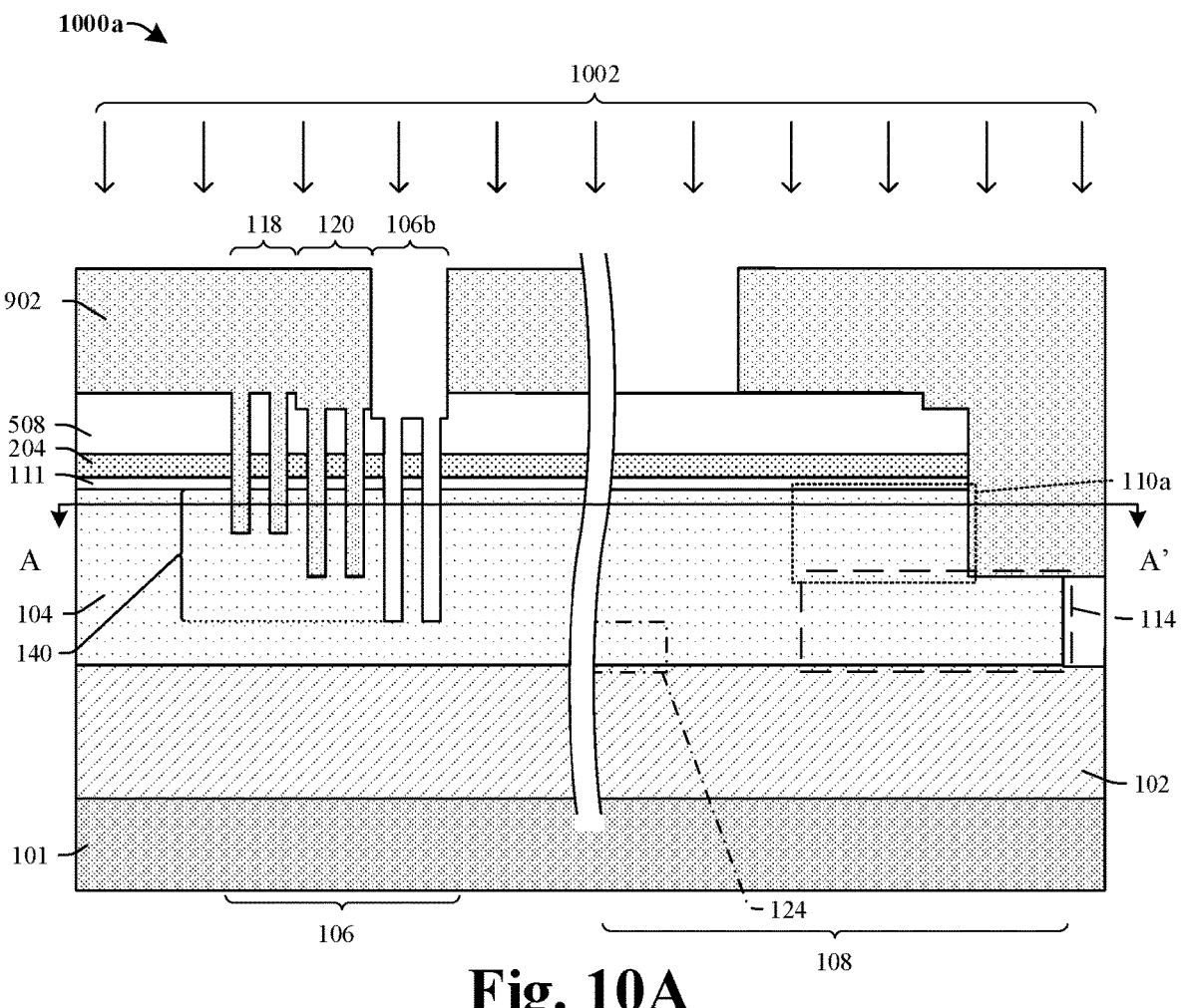
Figure 10B:
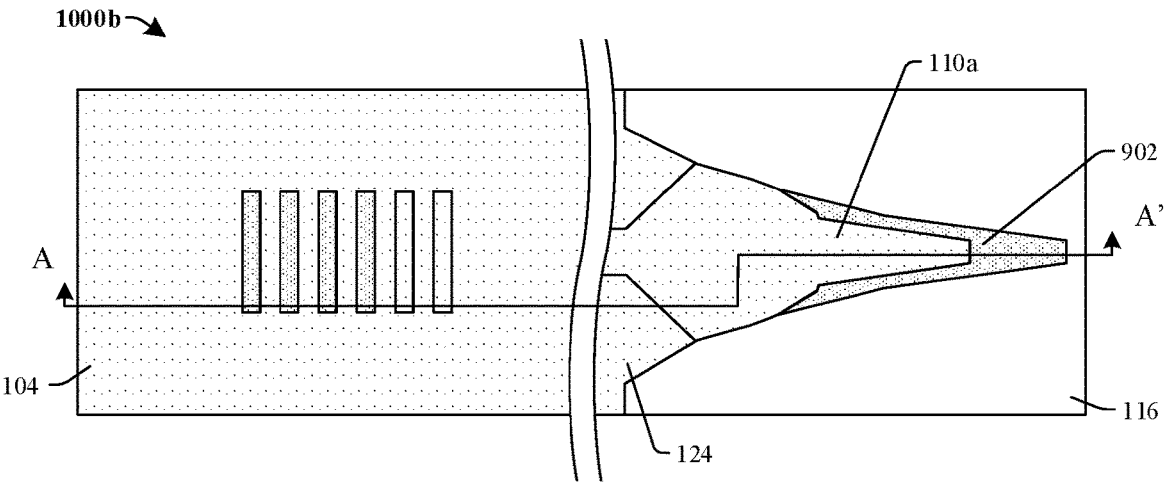

As illustrated in the cross-sectional view 1000a and top view 1000b of FIGS. 10A and 10B, a fourth etch 1002 is performed according to the fourth mask 902, extending the second portion 106b of trenches in the grating coupler region 106 to a third depth 140. In some embodiments, a back portion 124a is also further etched, exposing an upper surface of the back structure 124. In some embodiments, the fourth etch 1002 is a dry etch.

Figure 11A:
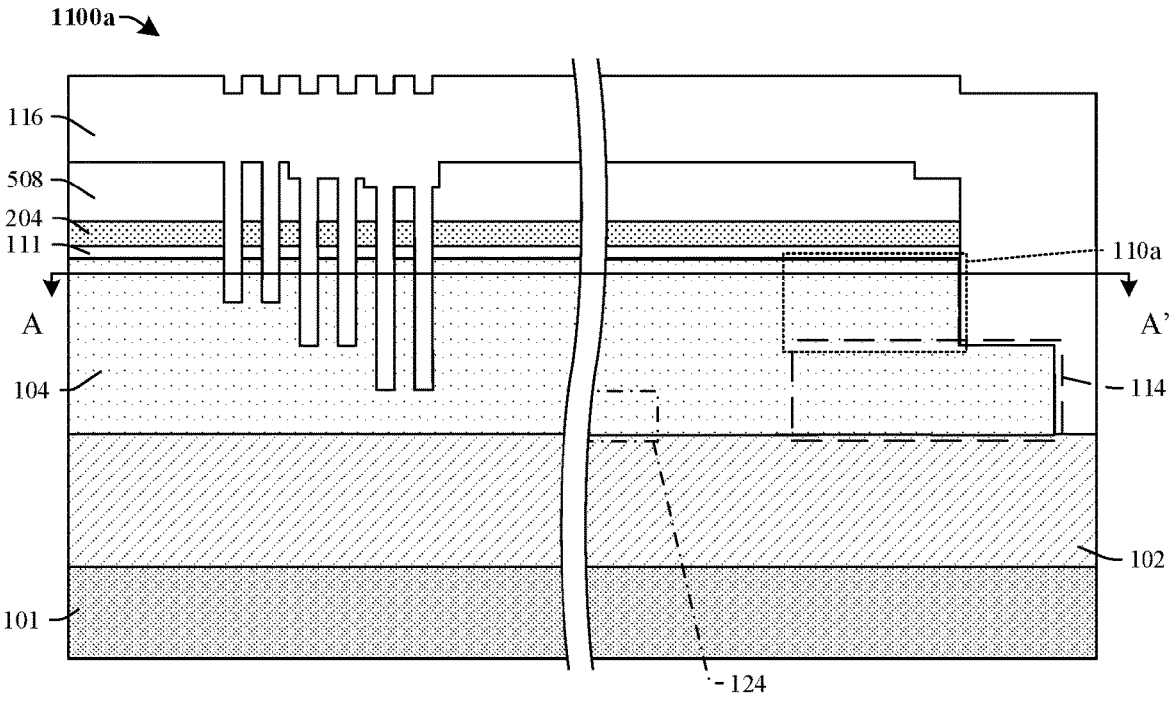
Figure 11B:
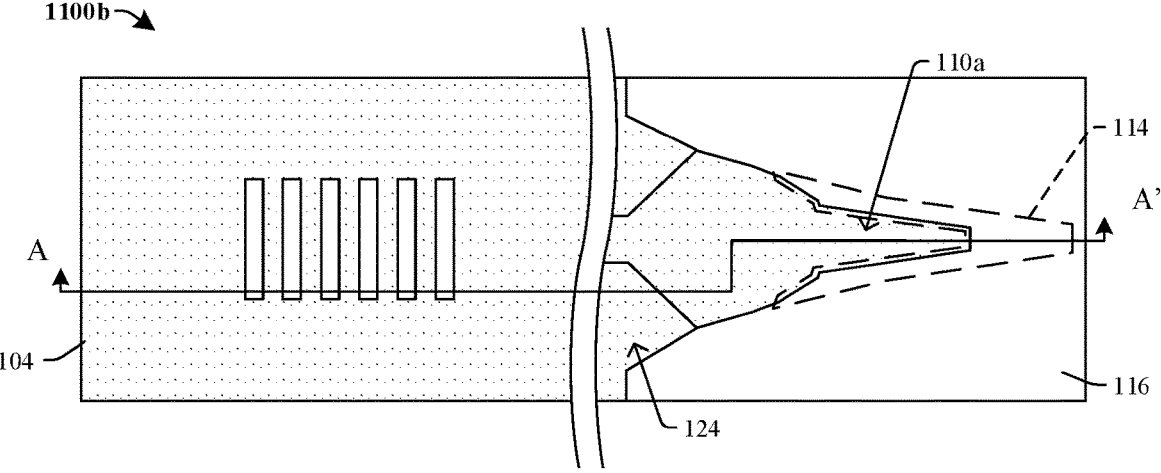

As illustrated in the cross-sectional view 1100a and top view 1100b of FIGS. 11A and 11B, an insulative layer is formed over the edge coupler region 108 and the grating coupler region 106, extending the insulator 116 over the semiconductor layer 104 and the hard mask layer 508 (see FIG. 10A). The insulator 116 extends into the plurality of trenches in the grating coupler region 106 and the openings formed over the edge coupler region 108. In some embodiments, the insulator 116 comprises an oxide. The insulative layer may be deposited using CVD, PVD, ALD, some other suitable deposition process(es), or any combination of the foregoing. In some embodiments, the insulative layer comprises silicon dioxide ($SiO_2$), a same material as the insulator 116, or the like.

Figure 12A:
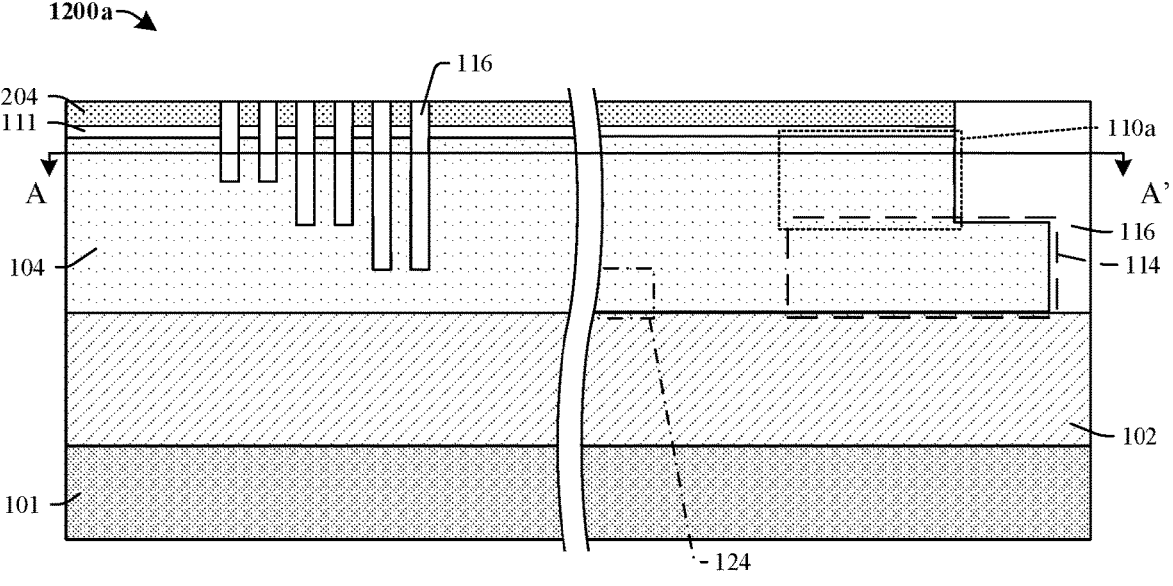
Figure 12B:
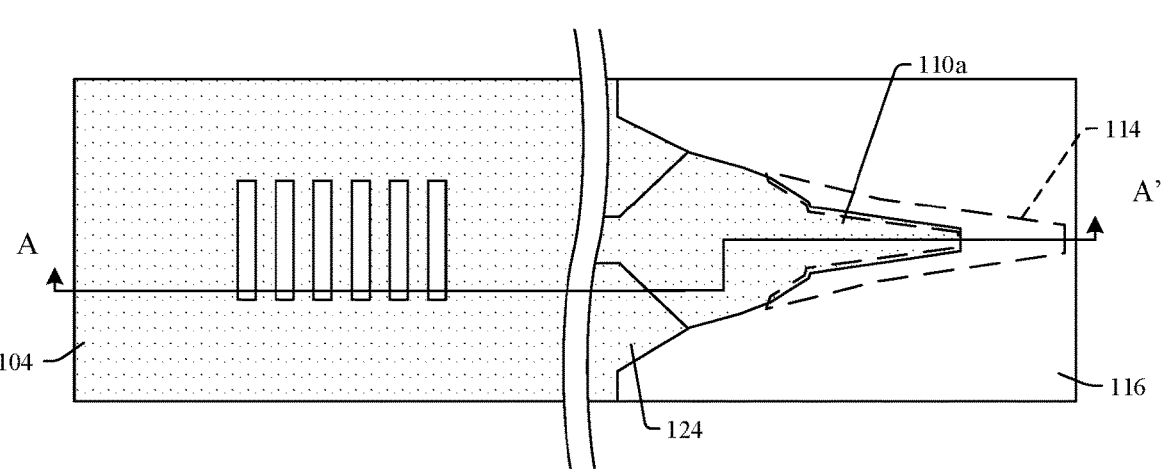

As illustrated in the cross-sectional view 1200a and top view 1200b of FIGS. 12A and 12B, portions of the insulator 116 above the etch stop layer 204 are removed. In some embodiments, the portions above the etch stop layer 204 are removed using a planarization process (e.g., a CMP process).

Figure 13B:
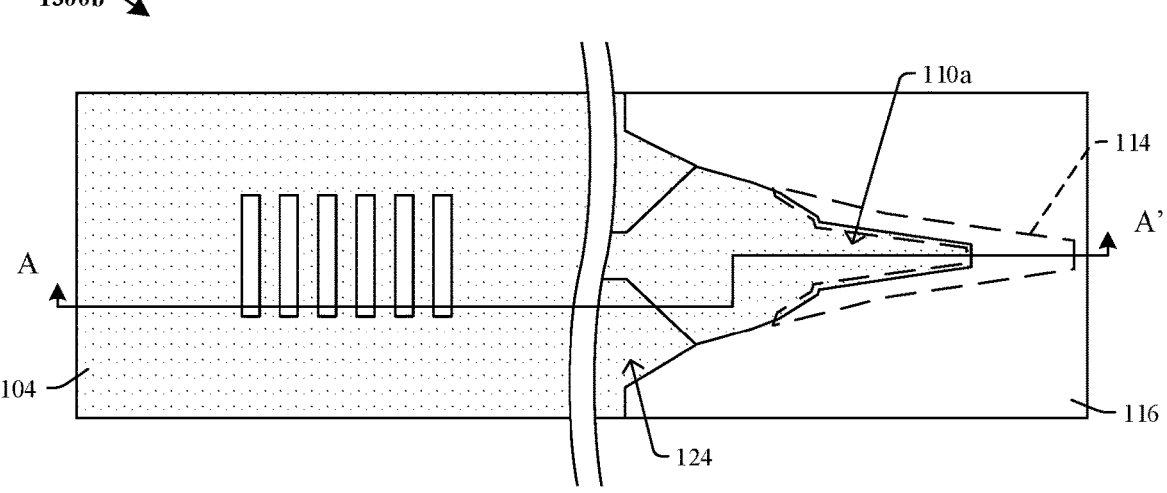

As illustrated in the cross-sectional view 1300a and top view 1300b of FIGS. 13A and 13B, the etch stop layer 204 is removed. In some embodiments, the etch stop layer 204 is removed using a wet etching process 1302. In other embodiments, the etch stop layer 204 is removed using a dry etching process.

Figure 14A:
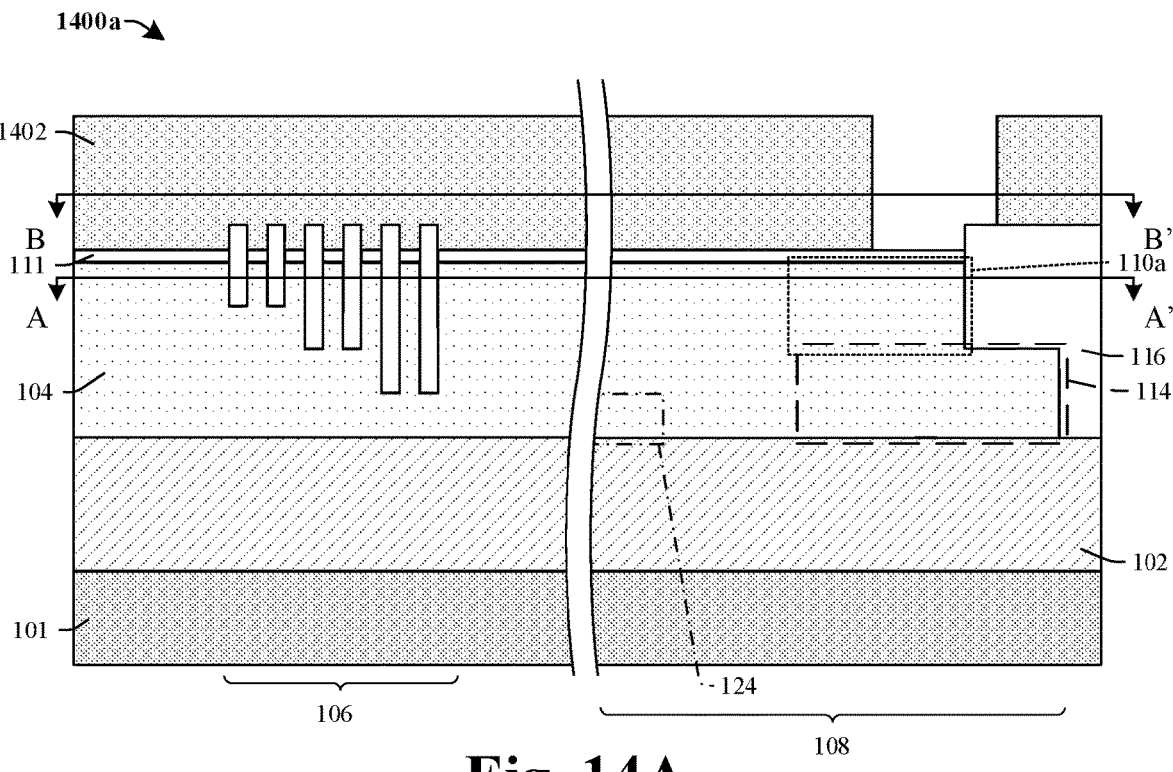
Figure 14B:
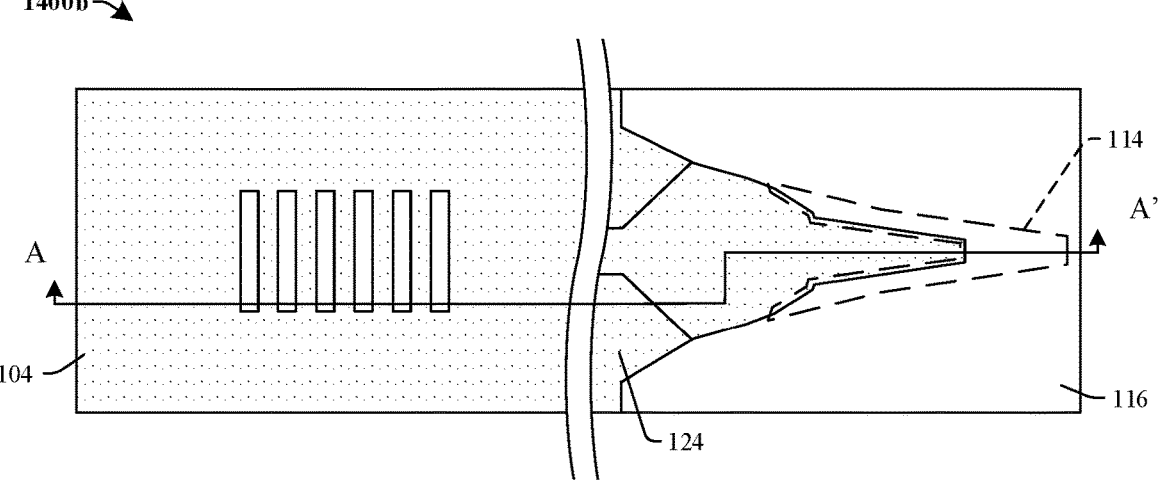
Figure 14C:
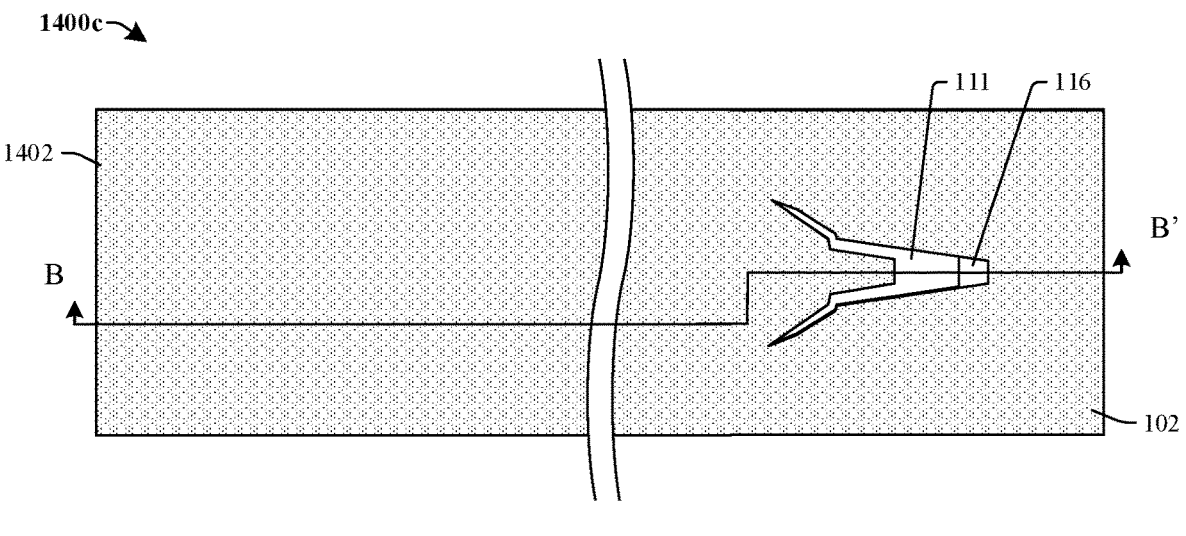

As illustrated in the cross-sectional view 1400a and top views 1400b, 1400c of FIGS. 14A, 14B and 14C, the fifth mask 1402 is formed over the grating coupler region 106 and the edge coupler region 108. As shown in FIG. 14A, the fifth mask 1402 covers the plurality of trenches in the grating coupler region 106 and exposes a portion of the upper structure precursor 110a in the edge coupler region 108. In some embodiments, the fifth mask 1402 is formed in a same way as the second mask 510.

Figure 15A:
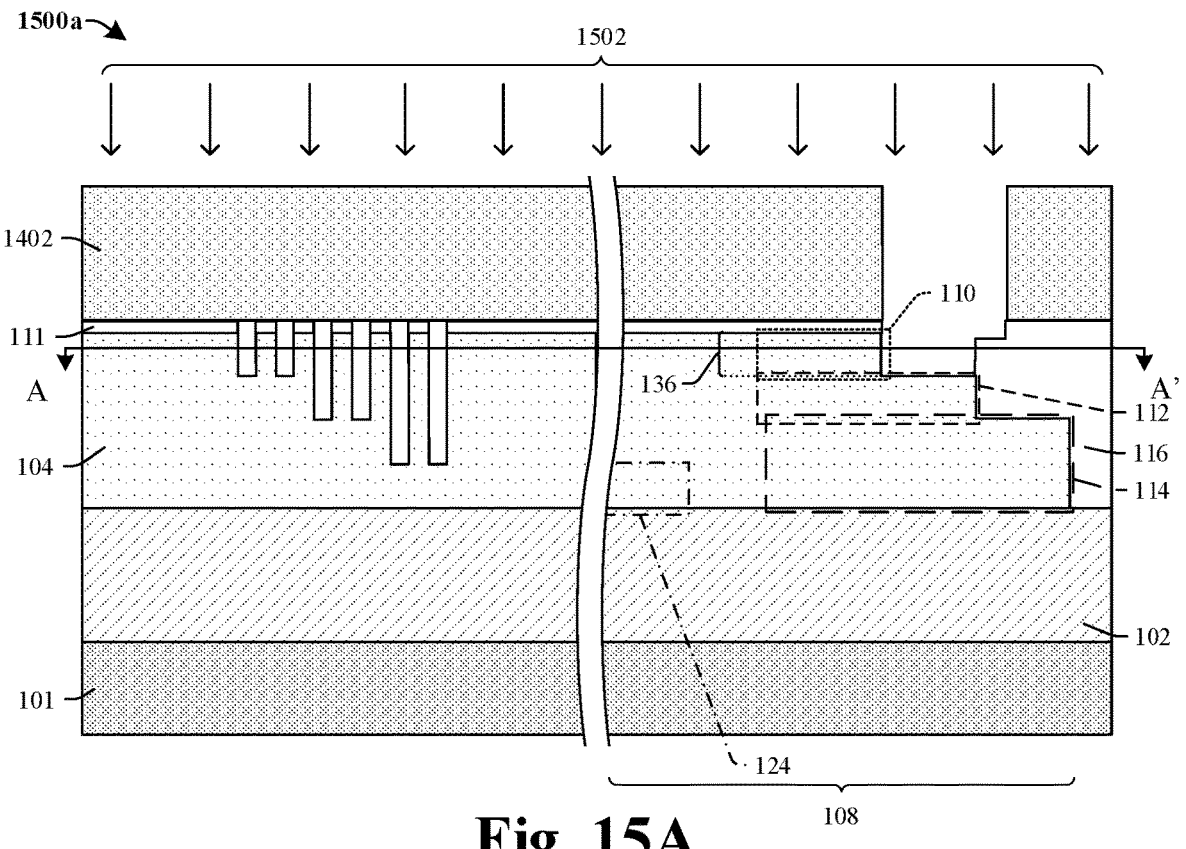
Figure 15B:
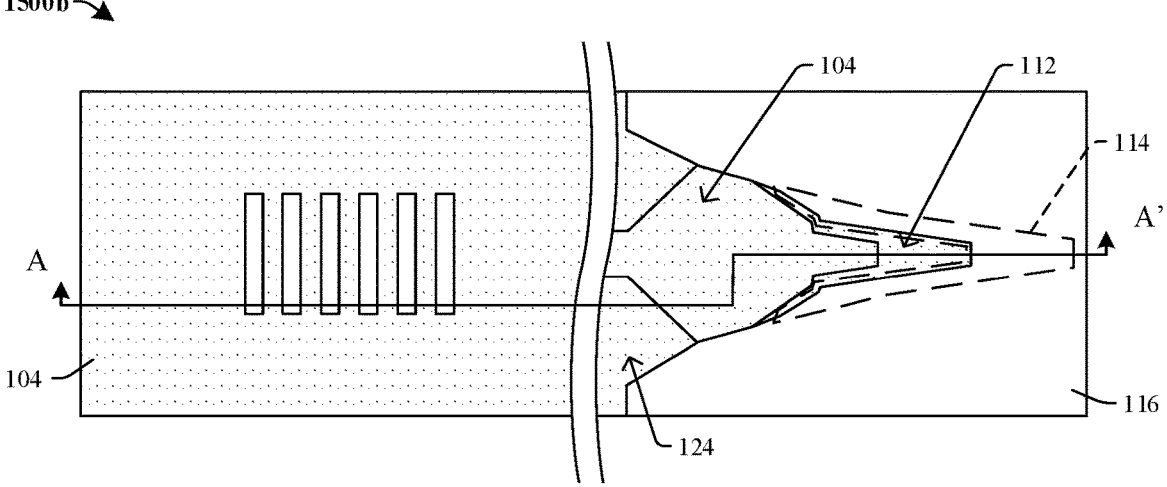
Figure 15C:
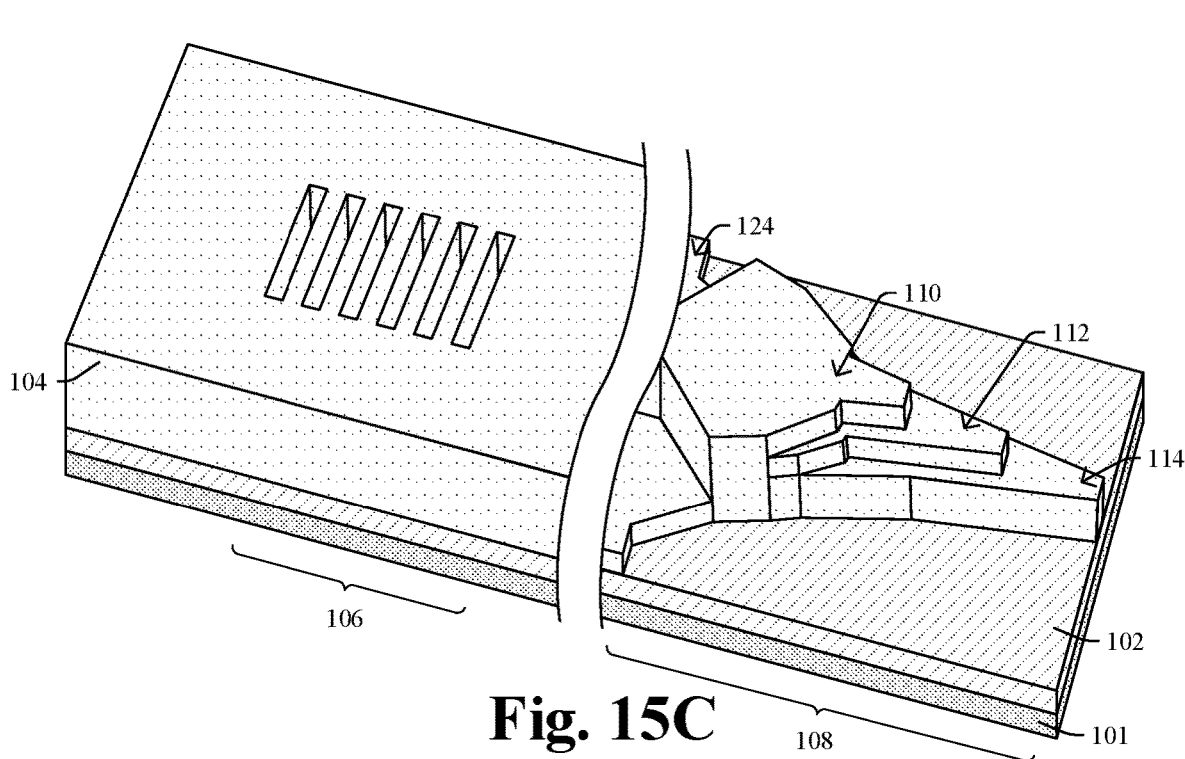

As illustrated in the cross-sectional view 1500a, the top view 1500b, and the perspective view 1500c of FIGS. 15A, 15B and 15C, a fifth etch 1502 is performed according to the fifth mask 1402, etching the upper structure precursor 110a (see FIG. 18A). The etching of the upper structure precursor 110a exposes an upper surface of the intermediate structure 112 and sidewalls of the upper structure 110 within the edge coupler region 108. In some embodiments, the fifth etch 1502 is a dry etch. The insulator 116 is not shown in FIG. 15C to better show the structure in the edge coupler region. In some embodiments, the fifth etch 1502 etches portions of an upper surface of the upper structure precursor 110a to the first depth 136.

Figure 16A:
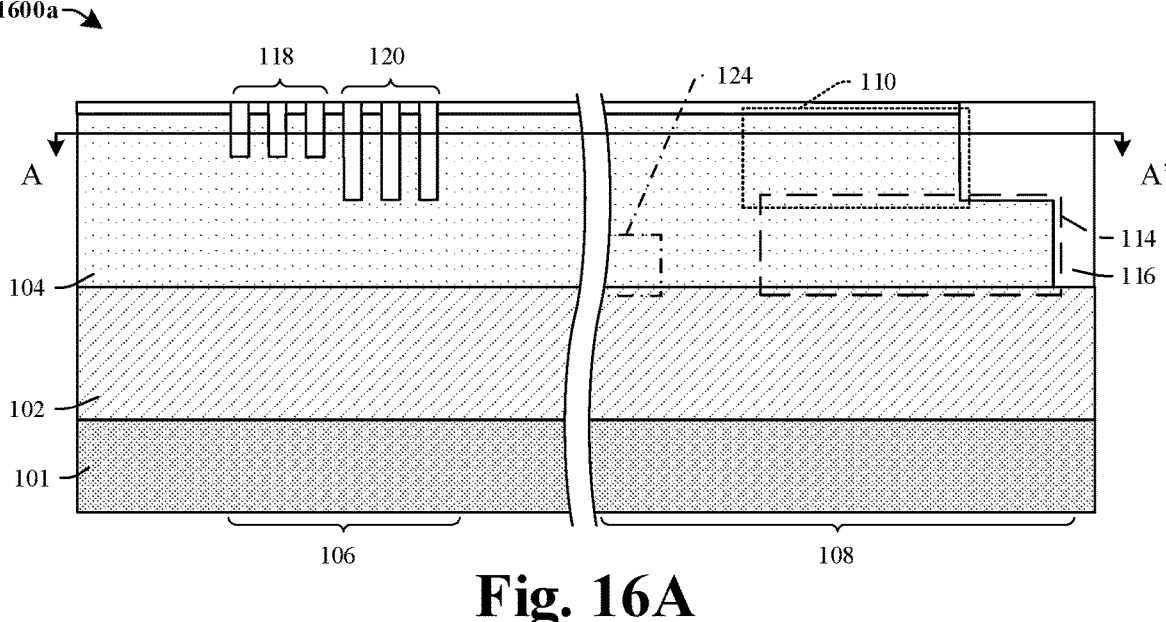
FIGS. 16A and 16B illustrate a top view and a cross-sectional view of some embodiments of a PIC including a grating coupler and an edge coupler with a base structure and an upper structure.
Figure 16B:
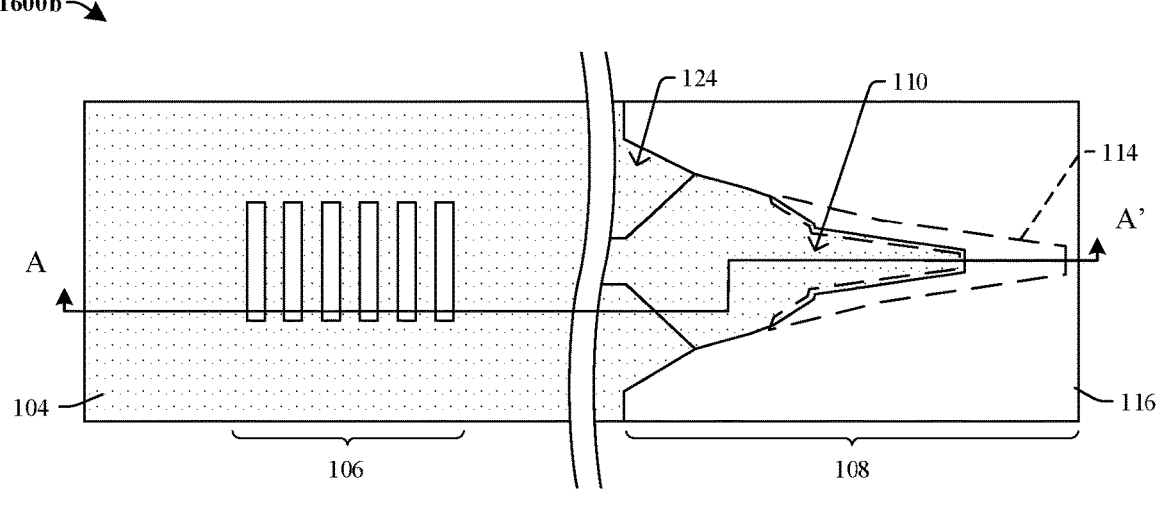

FIGS. 16A and 16B illustrate a top view 1600a and a cross-sectional view 1600b of some embodiments of a PIC including a grating coupler and an edge coupler with a base structure and an upper structure. They are now described concurrently. The insulator 116 is not shown in FIG. 16B to better show the structure in the edge coupler region 108.

In some embodiments, the intermediate structure 112 (see FIG. 1A) is not present between the upper structure 110 and the base structure 114. Tapered sidewalls of the upper structure 110 extend from the upper surface of the upper structure 110 to the upper surface of the base structure 114. In some embodiments, the third set of trenches 122 (see FIG. 1A) is omitted, and there are two sets of trenches with two different depths. An embodiment omitting a step to define the intermediate structure 112 (see FIG. 1A) and a third set of trenches 122 (see FIG. 1A) will not have photolithography and etching steps that are used exclusively for either the edge coupler region 108 or the grating coupler region 106. That is, each photolithography and etching step that affects the trenches in the grating coupler region 106 will also affect the upper structure 110 or base structure 114 of the edge coupler region 108. This results in a further integrated method, as steps exclusive to the formation of the grating coupler or the edge coupler have been removed. The added efficiency and loss reduction that comes from multiple trench depths and tapered structures in the optical couplers would be reduced compared to optical couplers with more trench depths and tapered structures, however.

Figure 17:
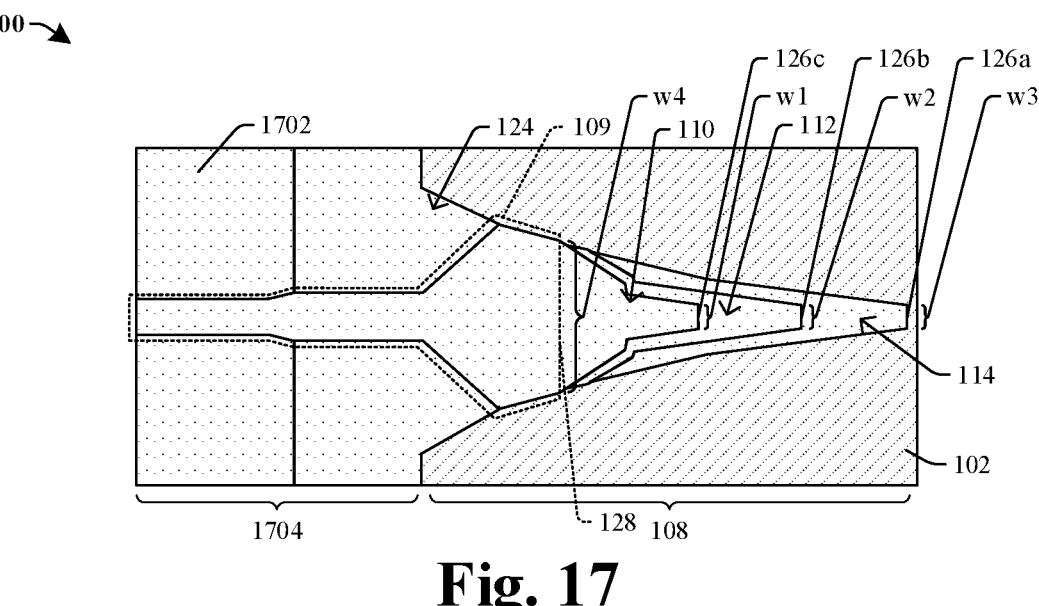
FIG. 17 illustrates a top view of some embodiments of an edge coupler with a joining structure.

FIG. 17 illustrates a top view 1700 of some embodiments of an edge coupler with a joining structure. The insulator 116 (see FIG. 1A) is not shown to better show the structure in the edge coupler region 108.

In some embodiments, a joining region 1704 extends from one side of the edge coupler region. In some embodiments, the joining region 1704 extends from the coterminous second end 128 of the base structure 114. In other embodiments, the joining region 1704 extends from the end of the base structure 114 that is facing away from the edge of the insulative layer 102. In some embodiments, the joining region 1704 contains additional structures 1702 that are configured to guide the electromagnetic waves from the edge coupler into the PIC. In further embodiments, the extended structure 109 extends into the joining region 1704.

In some embodiments, the first ends 126a, 126b, 126c of the base structure 114, the intermediate structure 112, and the upper structure 110 respectively have a first width w1, a second width w2, and a third width w3. The first width w1 is less than the second width w2, and the second width w2 is less than the third width w3. In further embodiments, the coterminous second end 128 of the base structure 114, the intermediate structure 112, and the upper structure 110 has a fourth width w4 that is greater than the first width w1, the second width w2, and the third width w3. In some embodiments, the first width w1 is approximately between 60 and 80 nanometers or the like. In some embodiments, the second width w2 is approximately between 70 and 90 nanometers or the like. In some embodiments, the third width w3 is approximately between 90 and 110 nanometers or the like. In some embodiments, the fourth width w4 is approximately between 150 and 600 nanometers or the like.

Figure 18:
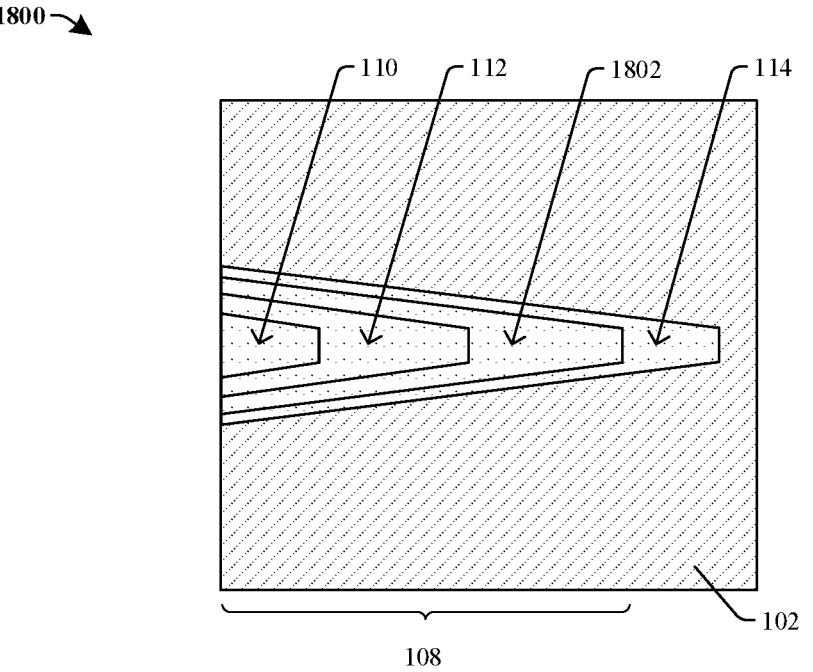
FIG. 18 illustrates a top view of some embodiments of an edge coupler with a second intermediate structure.

FIG. 18 illustrates a top view 1800 of some embodiments of an edge coupler with a second intermediate structure.

In some embodiments, the edge coupler region 108 has an additional intermediate structure 1802 between the intermediate structure 112 and the base structure 114. The additional intermediate structure 1802 may reduce the coupling loss of the edge coupler by altering the modal distribution of the electromagnetic waves traveling through the edge coupler in smaller increments. In some embodiments, the first end 126a of the base structure 114 is at or facing the edge of the insulative layer 102. In some embodiments, the first end 126a of the base structure 114 is separated from the edge of the insulative layer 102 by an insulator 116. The insulator 116 may protect the end of the base structure 114 from damage caused by the etching and dicing of the insulative layer 102.

In some embodiments, the back structure 124 (see FIG. 1A) and the extended structure 109 (see FIG. 1A) is omitted. This may be done to save space on the PIC.

Figure 19A:
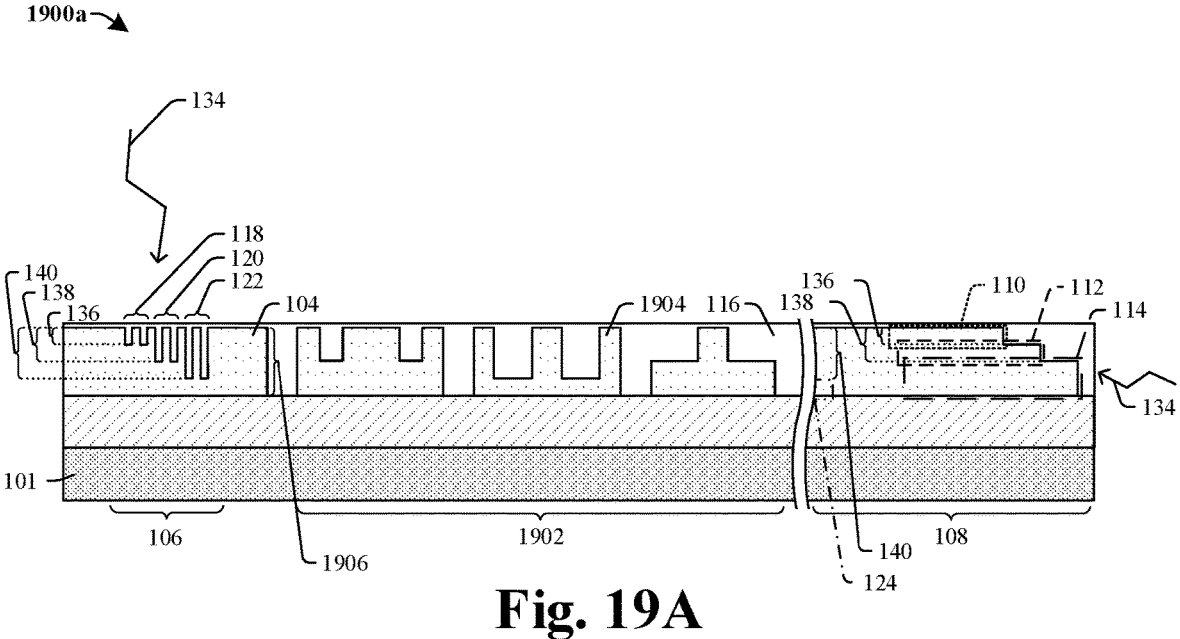
FIGS. 19A and 19B illustrate cross-sectional views of some embodiments of a PIC including a grating coupler and an edge coupler separated by waveguides.
Figure 19B:
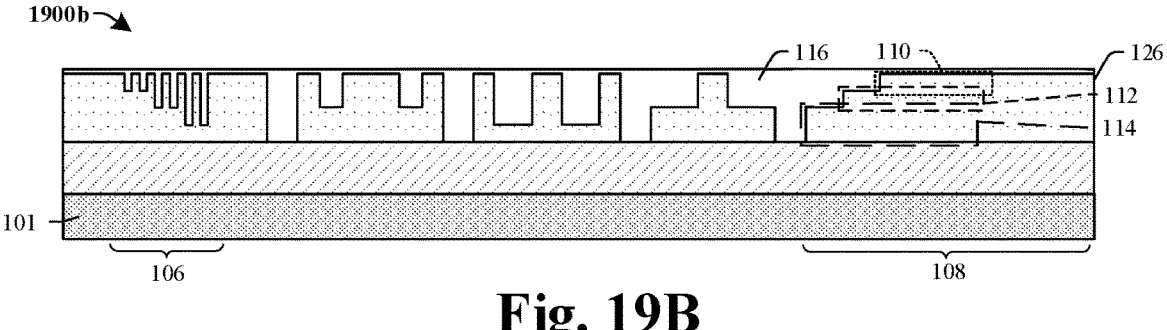

FIGS. 19A and 19B illustrate cross-sectional views 1900a, 1900b of some embodiments of a PIC including a grating coupler and an edge coupler separated by waveguides.

As shown in the cross-sectional view 1900a of FIG. 19A, in some embodiments, an intermediate region 1902 is formed within the semiconductor layer 104. The intermediate region 1902 includes a plurality of waveguides, lasers, polarizers, and other photonic circuit components 1904 that comprise the PIC. The grating coupler and the edge coupler direct electromagnetic waves 134 into the photonic circuit components 1904.

In some embodiments, the first set of trenches 118 in the grating coupler region 106 have bottom surfaces level with the first depth 136, while the second set of trenches 120 extend to a second depth 138 and the third set of trenches 122 extend to a third depth 140. In further embodiments, the uppermost surface of the intermediate structure 112 is at a first depth 136 from the top of the semiconductor layer 104, the uppermost surface of the base structure 114 is at a second depth 138, and the uppermost surface of the back structure 124 is at a third depth 140. That is, the first set of trenches 118 extend to a depth level with the uppermost surface of the intermediate structure 112, the second set of trenches 120 extend to a depth level with the uppermost surface of the back structure 124, and the third set of trenches 122 extend to a depth level with the uppermost surface of the back structure 124. In some embodiments, the semiconductor layer extends to a fourth depth 1906 from the top of the semiconductor layer, and the first depth 136 is less than half of the fourth depth 1906, while the third depth 140 is greater than half of the fourth depth 1906. In further embodiments, the second depth 138 is approximately half of the fourth depth 1906. In some embodiments, the first depth 136 is approximately 50 to 80 nanometers, approximately 30 to 65 nanometers, approximately 65 to 100 nanometers, or the like. In some embodiments, the second depth 138 is approximately 115 to 145 nanometers, approximately 95 to 130 nanometers, approximately 130 to 165 nanometers, or the like. In some embodiments, the third depth 140 is approximately 180 to 210 nanometers, approximately 160 to 195 nanometers, approximately 195 to 230 nanometers, or the like. In some embodiments, the fourth depth 1906 is approximately 245 to 275 nanometers, approximately 225 to 260 nanometers, approximately 260 to 295 nanometers, or the like.

As shown in the cross-sectional view 1900b of FIG. 19B, in some embodiments, the first ends 126a, 126b, 126c (see FIGS. 1A-1C) are coterminous at a coterminous first end 126, and the second ends 128a, 128b, 128c of the base structure 114, the intermediate structure 112, and the upper structure 110 are horizontally offset from one another. In such a configuration, the width of the coterminous first end 126 is greater than the widths of the second ends 128a, 128b, 128c. That is, the second ends 128a, 128b, 128c have a lesser width than the coterminous first end 126. In some embodiments, the widths of the second ends 128a, 128b, 128c are approximately equal to the widths w1, w2, w3 of the first ends 126a, 126b, 126c as described in FIG. 17.

FIG. 20 illustrates a methodology 2000 of forming PIC with an edge coupler and a grating coupler in accordance with some embodiments. Although this method and other methods illustrated and/or described herein are illustrated as a series of acts or events, it will be appreciated that the present disclosure is not limited to the illustrated ordering or acts. Thus, in some embodiments, the acts may be carried out in different orders than illustrated, and/or may be carried out concurrently. Further, in some embodiments, the illustrated acts or events may be subdivided into multiple acts or events, which may be carried out at separate times or concurrently with other acts or sub-acts. In some embodiments, some illustrated acts or events may be omitted, and other un-illustrated acts or events may be included.

At 2002, a deep trench etch through a semiconductor layer of a substrate is performed, exposing an edge coupler region with tapered sidewalls extending between a first end and a second end opposite the first end. See, for example, FIG. 7.

At 2004, a first etch on the substrate is performed, resulting in a first plurality of trenches extending to a first depth and a first portion of the edge coupler region being etched to the first depth. See, for example, FIG. 10.

At 2006, a second etch on the substrate is performed, the second etch extending a first portion of the first plurality of trenches to a second depth and etching the first portion of the edge coupler region to the second depth, exposing an upper surface of a base structure and tapered sidewalls of an intermediate structure within the edge coupler region. See, for example, FIG. 12.

At 2008, a third etch on the substrate is performed, extending a second portion of the first plurality of trenches to a third depth. See, for example, FIG. 14.

At 2010, a fourth etch on the substrate is performed, resulting in a second portion of the edge coupler region being etched to the first depth, exposing tapered sidewalls of an upper structure and an upper surface of the intermediate structure within the edge coupler region. See, for example, FIG. 19.

Therefore, the present disclosure relates to a method of forming a photonic integrated circuit comprising an edge coupler and a grating coupler.

Some embodiments relate to an integrated chip (IC) including a handle substrate; a semiconductor layer comprising a grating coupler region and an edge coupler region; an insulative layer between the handle substrate and the semiconductor layer; a grating coupler in the grating coupler region comprising a plurality of trenches arranged in the semiconductor layer; and an edge coupler in the edge coupler region of the semiconductor layer including: a base structure having a first end proximate to an edge of the insulative layer, and tapered sidewalls extending laterally from the first end; and an upper structure extending over the base structure, the upper structure having a first end proximate to the edge of the insulative layer, and tapered sidewalls extending laterally from the first end between the tapered sidewalls of the base structure; where the first end of the upper structure is a first distance from the edge of the insulative layer, and first end of the base structure is a second distance from the edge of the insulative layer, and the second distance is different from the first distance; and where the handle substrate continuously extends from directly beneath the plurality of trenches to directly beneath the upper structure.

Other embodiments relate to an integrated chip (IC) including: an insulative layer; a semiconductor layer on the insulative layer; a grating coupler including a plurality of trenches arranged in the semiconductor layer; and an edge coupler including: a base structure extending over the insulative layer, the base structure having a first end proximate to an edge of the insulative layer, and tapered sidewalls extending laterally from the first end; an upper structure extending over the base structure, the upper structure having a first end proximate to the edge of the insulative layer, and tapered sidewalls extending laterally from the first end; and an intermediate structure extending over the base structure and under the upper structure, the intermediate structure having a first end proximate to the edge of the insulative layer, and tapered sidewalls extending laterally from the first end; where bottom surfaces of the plurality of trenches are level with top surfaces of the intermediate structure and the base structure.

Yet other embodiments relate to a method of forming a grating coupler and an edge coupler on an integrated chip (IC), including: performing a deep trench etch through a semiconductor layer of a substrate, exposing an edge coupler region with tapered sidewalls extending between a first end and a second end opposite the first end; performing a first etch on the substrate, resulting in a first plurality of trenches extending to a first depth and a first portion of the edge coupler region being etched to the first depth; performing a second etch on the substrate, the second etch extending a first portion of the first plurality of trenches to a second depth and etching the first portion of the edge coupler region to the second depth, exposing an upper surface of a base structure and tapered sidewalls of an intermediate structure within the edge coupler region; performing a third etch on the substrate, extending a second portion of the first plurality of trenches to a third depth; and performing a fourth etch on the substrate, resulting in a second portion of the edge coupler region being etched to the first depth, exposing tapered sidewalls of an upper structure and an upper surface of the intermediate structure within the edge coupler region.

It will be appreciated that in this written description, as well as in the claims below, the terms "first", "second", "second", "third" etc. are merely generic identifiers used for ease of description to distinguish between different elements of a figure or a series of figures. In and of themselves, these terms do not imply any temporal ordering or structural proximity for these elements, and are not intended to be descriptive of corresponding elements in different illustrated embodiments and/or un-illustrated embodiments. For example, "a first dielectric layer" described in connection with a first figure may not necessarily correspond to a "first dielectric layer" described in connection with another figure, and may not necessarily correspond to a "first dielectric layer" in an un-illustrated embodiment.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of forming a grating coupler and an edge coupler on an integrated chip (IC), comprising:
   performing a deep trench etch through a semiconductor layer of a substrate, exposing an edge coupler region with tapered sidewalls extending between a first end and a second end opposite the first end;
   performing a first etch on the semiconductor layer, resulting in a first plurality of trenches extending to a first depth and a first portion of the edge coupler region being etched to the first depth;
   performing a second etch on the semiconductor layer, the second etch extending a first portion of the first plurality of trenches to a second depth and etching the first portion of the edge coupler region to the second depth, exposing an upper surface of a base structure and tapered sidewalls of an intermediate structure within the edge coupler region;
   performing a third etch on the semiconductor layer, extending a second portion of the first plurality of trenches to a third depth; and
   performing a fourth etch on the semiconductor layer, resulting in a second portion of the edge coupler region being etched to the first depth, exposing tapered sidewalls of an upper structure and an upper surface of the intermediate structure within the edge coupler region.

2. The method of claim 1, wherein the second portion of the edge coupler region has tapered sidewalls that are exposed after the first etch, and wherein the tapered sidewalls are covered by an insulator during the fourth etch.

3. The method of claim 1, wherein a first end of the base structure is exposed in the deep trench etch, a first end of the intermediate structure is exposed in the second etch, and a first end of the upper structure is exposed in the fourth etch.

4. The method of claim 1, further comprising:
   before the first etch, depositing an etch stop layer over the substrate;
   after the third etch, depositing an insulative layer in the first plurality of trenches and over tapered sidewalls of the intermediate structure exposed by the second etch;
   performing a CMP process to remove portions of the insulative layer above the etch stop layer; and
   removing the etch stop layer before the fourth etch.

5. The method of claim 1, wherein the first, second and third etch further comprise etching a second plurality of trenches between the first plurality of trenches and the edge coupler region, wherein the second plurality of trenches delineate waveguides between the first plurality of trenches and the edge coupler region.

6. The method of claim 1, wherein the substrate is a silicon-on-insulator (SOI) substrate, wherein the semiconductor layer of the SOI substrate extends to a fourth depth, and wherein the first depth is less than half of the fourth depth, and the third depth is greater than half of the fourth depth.

7. A method of forming an integrated device, comprising:
   receiving a handle substrate having an insulative layer on the handle substrate and a semiconductor layer on the insulative layer, the semiconductor layer having a first upper surface;
   forming a first mask over the semiconductor layer, the first mask covering an edge coupler region of the semiconductor layer;
   performing a deep trench etch through the semiconductor layer according to the first mask, thereby exposing a first plurality of tapered sidewalls and a first end of the edge coupler region facing a first direction;
   forming a second mask over the semiconductor layer that is laterally spaced from the first plurality of tapered sidewalls and the first end of the edge coupler region;
   performing a first etch on the semiconductor layer according to the second mask, resulting in a first portion of the edge coupler region laterally between the second mask and the first plurality of tapered sidewalls being etched to a first depth beneath the first upper surface of the semiconductor layer;
   forming a third mask over the semiconductor layer that covers the first upper surface within the edge coupler region;
   performing a second etch on the semiconductor layer according to the third mask, etching the first portion of the edge coupler region to a second depth beneath the first upper surface of the semiconductor layer, resulting in a second upper surface in the edge coupler region at the second depth and a second plurality of tapered sidewalls extending from the first upper surface to the second upper surface;
   forming a fourth mask over the semiconductor layer, wherein the fourth mask is patterned to expose a second portion of the edge coupler region that is spaced from the first end of the edge coupler region by the second upper surface in the edge coupler region; and performing a third etch on the semiconductor layer according to the fourth mask, thereby removing material in the second portion of the edge coupler region, exposing a back upper surface of a back structure at a third depth beneath the first upper surface and additional tapered sidewalls extending from the back structure to the first upper surface.

8. The method of claim 7, wherein the semiconductor layer further comprises a grating coupler region;

wherein the second mask extends over the grating coupler region and has a first plurality of openings over the grating coupler region;

wherein the first etch further etches a plurality of trenches into the grating coupler region extending to the first depth;

wherein the third mask covers a first portion of the plurality of trenches but has an opening over a second portion and a third portion of the plurality of trenches;

wherein the second etch etches the second portion and the third portion of the plurality of trenches to the second depth concurrent with etching the first portion of the edge coupler region; and wherein the fourth mask covers the first portion and the second portion of the plurality of trenches and has an opening over the third portion of the plurality of trenches.

9. The method of claim 8, further comprising:

forming an additional mask after performing the third etch, the additional mask having first sidewalls aligned with the second plurality of tapered sidewalls and second sidewalls over the first upper surface and facing the second plurality of tapered sidewalls; and performing an additional etch, resulting in a second portion of the edge coupler region laterally between the second sidewalls of the fourth mask and the second plurality of tapered sidewalls being etched to the first depth, exposing in a third upper surface in the edge coupler region extending to the first depth between the first upper surface and the second upper surface, as well as a third plurality of tapered sidewalls extending from the third upper surface to the first upper surface.

10. The method of claim 9, wherein the second etch defines an upper structure precursor that is between the second plurality of tapered sidewalls and is over the second upper surface; and wherein the additional etch removes portions of the upper structure precursor, resulting in an intermediate structure having the second plurality of tapered sidewalls and the third upper surface confined between the second upper surface and an upper structure having the third plurality of tapered sidewalls and the first upper surface.

11. The method of claim 10, wherein the second etch results in the upper structure precursor having a second end facing the first direction and recessed from the first end; and wherein the additional etch results in the upper structure having a third end facing the first direction and recessed from the first end and the second end.

12. The method of claim 7, wherein the second depth is greater than the first depth.

13. The method of claim 7, wherein the third depth is greater than the first depth and the second depth.

14. A method of forming an integrated device, comprising:

receiving a substrate having an insulative layer on the substrate and a semiconductor layer on the insulative layer, the semiconductor layer having a first upper surface, a grating coupler region, and an edge coupler region between the grating coupler region and a first edge of the first upper surface;

performing a deep trench etch through the semiconductor layer, thereby exposing a first plurality of tapered sidewalls and a first end of the edge coupler region facing a first direction;

performing a first etch on the semiconductor layer, etching a plurality of trenches into the grating coupler region and a first portion of the edge coupler region at the first plurality of tapered sidewalls to a first depth beneath the first upper surface of the semiconductor layer;

forming and patterning a mask over the semiconductor layer, wherein after the patterning, the mask covers a first portion of the plurality of trenches, while a second portion of the plurality of trenches and the first portion of the edge coupler region are exposed; and performing a second etch on the semiconductor layer according to the mask, etching the second portion of the plurality of trenches and the first portion of the edge coupler region to a second depth beneath the first upper surface of the semiconductor layer, thereby exposing a second plurality of tapered sidewalls extending between the first plurality of tapered sidewalls.

15. The method of claim 14, further comprising performing a third etch on the semiconductor layer, the third etch extending a third portion of the plurality of trenches to a third depth and exposing an uppermost surface of a back structure in the edge coupler region and spaced from the first edge of the semiconductor layer by the second plurality of tapered sidewalls.

16. The method of claim 15, further comprising performing a fourth etch on the semiconductor layer in the edge coupler region, wherein the fourth etch removes portions of the second plurality of tapered sidewalls and results in a third plurality of tapered sidewalls that are between the second plurality of tapered sidewalls.

17. The method of claim 15, wherein after the third etch, first segments of the first plurality of tapered sidewalls extend from a first lower surface of the semiconductor layer to a second upper surface exposed by the second etch, second segments of the first plurality of tapered sidewalls extend from the first lower surface of the semiconductor layer to the first upper surface of the semiconductor layer, and third segments of the first plurality of tapered sidewalls extend from the first lower surface to the uppermost surface of the back structure.

18. The method of claim 14, wherein the deep trench etch extends from the first upper surface of the semiconductor layer to a first lower surface of the semiconductor layer.

19. The method of claim 14, wherein after the second etch, first segments of the first plurality of tapered sidewalls extend from a first lower surface of the semiconductor layer to a second upper surface exposed by the second etch, and second segments of the first plurality of tapered sidewalls extend from the first lower surface of the semiconductor layer to the first upper surface of the semiconductor layer.

20. The method of claim 14, wherein the first portion and the second portion of the plurality of trenches have an equal number of trenches.

* * * * *